United States Patent
Purkeypile et al.

(10) Patent No.: US 7,653,903 B2
(45) Date of Patent: Jan. 26, 2010

(54) MODULAR IMAGING DOWNLOAD SYSTEM

(75) Inventors: Matthew D. Purkeypile, San Jose, CA (US); Jeffrey T. Sulm, Sunnyvale, CA (US); Stephen Phillips, Santa Clara, CA (US); Victor G. Reha, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 793 days.

(21) Appl. No.: 11/090,637

(22) Filed: Mar. 25, 2005

(65) Prior Publication Data

US 2006/0218547 A1 Sep. 28, 2006

(51) Int. Cl.
*G06F 9/445* (2006.01)

(52) U.S. Cl. .................. 717/178; 717/173

(58) Field of Classification Search .............. None
See application file for complete search history.

(56) References Cited

U.S. PATENT DOCUMENTS

| | | | | |
|---|---|---|---|---|
| 5,809,251 | A * | 9/1998 | May et al. | 709/223 |
| 6,378,127 | B1 * | 4/2002 | Delo | 717/174 |
| 2002/0052941 | A1 | 5/2002 | Patterson | |
| 2002/0107959 | A1 | 8/2002 | Shteyn | |
| 2002/0124245 | A1 * | 9/2002 | Maddux et al. | 717/176 |
| 2002/0167546 | A1 | 11/2002 | Kimbell et al. | |
| 2003/0001903 | A1 * | 1/2003 | Duffy | 345/810 |
| 2003/0154279 | A1 | 8/2003 | Aziz | |
| 2003/0208378 | A1 | 11/2003 | Thangaraj et al. | |
| 2004/0078182 | A1 | 4/2004 | Nixon et al. | |
| 2004/0103220 | A1 | 5/2004 | Bostick et al. | |
| 2004/0146272 | A1 | 7/2004 | Kessel et al. | |
| 2004/0210894 | A1 | 10/2004 | Zarco | |
| 2005/0022129 | A1 | 1/2005 | Borenstein et al. | |

* cited by examiner

*Primary Examiner*—Chuck O Kendall
(74) *Attorney, Agent, or Firm*—John P. O'Banion

(57) ABSTRACT

A system and method of modular image downloading (MINDS) from a network for configuring computers, or computer-based devices. The program images typically comprise a foundation image (operating system) and application module images. The system is configured as software which executes in response to a tree of actions defined in configuration data and not embedded within the executable of the MINDS program. The action tree can be controlled by the user interface, started, paused, terminated, stepped forward or backward, and so forth. The executable operates on the action tree and need not be re-compiled for each action tree change, the modules for the action trees are dynamically linked prior to execution. The action tree approach allows the user to readily change, add, or delete actions, or entire action trees from the system without the need of recoding or additional program testing.

20 Claims, 18 Drawing Sheets

| Select Modules and Switches | | | |
|---|---|---|---|
| ☐ MOD-Click_to_DVD | 0406801.SND ▷ | ☐ MOD-Photoshop_Elements | 0406402.SND ▷ |
| ☐ MOD-MS_Works_Bundle | 0405715.SND ▷ | ☐ XMOD-Video_editing | 0334506.SND ▷ |
| ☐ MOD-Office_2003_Basic | 0405506.SND ▷ | ☑ MOD-Welcome_to_VIAO | 0406901.SND ▷ |
| ☐ MOD-Office_2003_Small | 045724.SND ▷ | ☑ XMOD-WinDVD | 0406503.SND ▷ |
| ☑ MOD-Office_2003_Small | 0405807.SND ▷ | ☑ Microsoft_Switch_OS_Win | Switch ▷ |
| ☐ MOD-S_S_M_S | 0320402.SND ▷ | ☑ MOD-SonyITD_Switch_SWI_HD | Switch ▷ |
| ☐ MOD-Screenblast_Acid_S | 0323117.SND ▷ | ☑ MOD-SonyITD_Switch_SWI_Winl | Switch ▷ |
| ☐ MOD-Video_Editing_Pro | 0405802.SND ▷ | ☑ MOD-SonyITD_Switch_SWI_Diff | Switch ▷ |
| ☐ XMOD-Drag_n_Drop_DVI | 0406502.SND ▷ | ☑ MOD-SonyITD_Switch_SWI_DX | Switch ▷ |
| ☑ XMOD-Norton_AV_Trial | 0401501.SND ▷ | | OK |

FIG. 16

MODULAR IMAGING DOWNLOAD SYSTEM

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to computer program configuration, and more particularly to an image network download system that is action tree-based.

2. Description of Related Art

Configuring the software in modern computers and computerized devices is becoming increasingly complex as the number of possible models, option sets and other variants increases. For example in supporting the sale of configured to order (CTO) computers the matrix of choices available for a given system, when considering the different foundation images and application image sets, could run up into the millions of different image sets, any of which would need to be copied to the hard drive of the computer.

Typically, the choices involve a small number of foundation image sets which relate to the specific hardware in addition to a collection of application modules which could be installed to run on those computers.

This plethora of image choices is a burden not only in the production environment, but in other areas as well, such as within engineering, testing, quality assurance, service and so forth wherein the software and/or applications must be configured or reconfigured to any of the present or previous configurations available from manufacturing. To create these hard drive images, modular image download programs have been created which load a foundation image along with a predetermined set of application module images which are to be installed on the hard drive. For any one release of hardware and/or software there may exist a number of different varieties of the imaging program, for example versions for the Factory, Engineering, Test, Quality Assurance, Service Department and so forth.

Typically, in the CTO environment the determination of what is to be loaded to a given system is determined at least partially, if not fully, in response to the information which is contained within a desktop management interface (DMI). The DMI is an area in the hardware of a computer device in which a string, referred to herein as Mcode, is contained. The DMI also includes a section referred to as UUID which provides a unit serial number for the hardware. The bits of Mcode retained in the DMI indicate information about the device, such as hardware characteristics along with what foundation image and other modules are loaded, or are to be loaded. Since Mcode is not contained on the hard drive, the hard drive may be repartitioned and formatted as necessary without affecting the state of the Mcode. Mcode is written to the DMI before the downloading of images onto the hard drive.

About a decade ago the industry primarily relied on the use of batch files for downloading images to the hard drive of a new system. The batch files used multiple data sources and severely lacked flexibility making it difficult or even unrealistic to consider supporting a large number of different image sets. In addition any changes to the configuration had to be carried out across multiple data sources and batch files, wherein the process was labor intensive, error prone and tedious.

More recently modular network imaging was introduced which relied on a single data source and a suite of programs written in a high-level language that typically leveraged the functions made available within the application programming interface (API) of the operating system. The download process was performed in response to the execution of separate executables. One such download configuration program utilized at Sony is referred to as MINDS (Modular Network Download System) version 1 which was utilized in combination with a program toolset known as Pacific Tools.

It should be appreciated that the ability to build a system with different foundation and application modules is necessary to support the sale of configure to order (CTO) computers which offer the customer different sets of software. An example is that of allowing the customer to select the word processing and multimedia software to be loaded on their machine. The process of taking a foundation image and adding modules to create an image is known herein as Sony Modular Technology. The benefit of this technology is that an exponentially increasing number of images can be offered to the customer. For example, letting x equal the number of foundation images, y equal the number of modules, and z equal the number of unique images that can be offered; the equation $z=x2^y$ describes the size of the number of different images. By way of example with twenty three foundation images and thirty three modules the number of unique possible images that could be offered to customers is over eighty seven billion, although typically only a subset of these are offered at any one time. A manufacturer having the capability to offer and support a large number of possible images provides a competitive advantage.

The life cycle of an image can be considered to have a number of phases. (1) Planning—Program management decides what software will be placed on a particular type of PC. (2) Development of image components—Integration of software into foundation images, modules, and recovery components. (3) Testing image components—Testing of integration, software, and various CTO options. (4) Releasing and delivering image components—Sending components to production sites. (5) Support—Supporting products via sustaining, refurbish, and repair.

Typically, the most technically challenging stage of image life cycle is development, while the most labor intensive is testing. In either case systems are frequently re-imaged with new software. One of the primary reasons for reimaging is to test the various CTO options. Another reason is to return the system to an "as-shipped" factory state.

Due to this need to frequently re-image systems, especially during testing, the process of imaging has historically been a bottleneck due to the amount of time it required. A system is unusable until the imaging process is complete. Furthermore an engineer has to spend time to image the system by providing input or swapping CDs, in what is typically a very time consuming process that is prone to errors. Thus the process of imaging a system requires the time of an engineer and results in the system being unusable while imaging takes place. It will be appreciated that many benefits can be derived from minimizing these times to reduce or eliminate the bottleneck.

There have been attempts at a solution, but all fall short in terms of time requirements and flexibility.

Early imaging solutions were manual processes to image the systems using CDs that were called "Install CDs". This process was relied-upon before the development of the first modular imaging network download solution, such as MINDS version 1. Install CDs typically utilized MS-DOS as the operating system and were on CD (as opposed to a faster medium), wherein it commonly required an engineer about a half day to image a system. This process also had the additional cost and delay of having to replicate CDs before systems could be imaged, increasing the bottleneck even further. Furthermore, the selection of options was very complicated and limited.

At the time the first modular imaging network download solution (i.e., MINDS version 1) was developed a new method was devised to image systems. This method provided a manual process that imaged a system over a local area network (LAN) as opposed to CDs. While MS-DOS was still the operating system used, this switching from CDs to a LAN decreased the total time to image a system from half a day to a roughly three hours. While the speed was increased, the various CTO options were not available to test.

Furthermore, since this process was performed manually there was a fundamental weakness in the imaging process, making it difficult to image a system the same way twice. This lack of consistency arises from having to manually perform many steps in the imaging process and posed a significant problem. Eliminating the need to perform these manual steps would eliminate the inconsistency.

The MINDS version 1 imaging software was created to leverage the power of new advancements in PCs and resulted in a process that was able to image a system in about an hour while only requiring about ten minutes of engineering time, which was a substantial improvement over the use of installation CDs. MINDS v1 also was configured to interact with a Software Management System (SMS) database to allow for testing of CTO options for the first time and had the ability to upload images to the LAN as well. The deployment of MINDS v1 meant that images were uploaded and downloaded in a consistent manner for the first time, which also increased the accuracy of testing.

Although the current MINDS v1 program provided a number of advantages, as would similar configuration programs used in the industry, it still suffers from a number of shortcomings which reduce the flexibility of the download process and complicate user interaction.

Accordingly, there is a need for enhanced software within a modular network download system which provides added flexibility and ease of use, the present invention fulfills those needs as well as others.

BRIEF SUMMARY OF THE INVENTION

The modular image network download system (MINDS version 2) described by the present invention is a collection of software that downloads a software image to a target computer system from a storage area network (SAN) and/or uploads an image from a target computer system to the SAN. The new download system is organized about a tree structured action environment which overcomes a number of drawbacks with previous download systems.

During the process of configuring a system an image is constructed in the system by writing the desktop management interface (DMI), setting up the hard drive, downloading the foundation image, installing the modules and cleaning up. Another purpose of the system allows a software image to be uploaded from a computer to the network for download access by other users. The MINDS software according to the present invention allows for ongoing re-imaging with current or prior image sets.

Although the first MINDS system (version 1) provided a number of advantages, it was also found lacking in some other areas. In particular, one problem that was identified was that the image sets for the download were substantially static, wherein any changes to be made required that the programs be recompiled. The complex process to image a system has been rapidly evolving, and the constant barrage of changes required more code changes to MINDS v1 than was anticipated; at times changes were made daily. Ideally, these software changes should be fully tested, however, time and resource constraints often make this impractical. Furthermore, as rapid deployment of these changes was often crucial the practice of creating well engineered and efficient solutions could be compromised.

The implementation of MINDS v1 required that multiple parallel versions of the program be created with differing user flow and functionality for supporting the various user groups. These parallel versions resulted in increased time for software maintenance and increased time for deployment.

During the downloading process with the current modular download system (MINDS v1) some of the files had to be transferred across the local area network several times, leading to an increase in the total time required to image a system, as well as increasing network loading. Parts of the imaging process were performed before all the user input was gathered, resulting in more engineering time required to image a system than was necessary due to the fact that the user would have to wait for tasks, such as transferring files between the network and target system, before continuing to provide input. Another drawback was that the user could not go back and correct mistakes, such as incorrect inputs or selections. The only way to correct mistakes was to restart the entire process, therein losing the time and efforts already expended to get to the point in the process at which the error was made.

To overcome these drawbacks the MINDS v2 program was designed to allow the user to create images in response to actions, and more particularly to action trees. The data for the process is retrieved from the software management system (SMS), which in the case of Sony VAIO environment is referred to known as the VSMS (VAIO Software Management System). The MINDS system is preferably configured for operating from a subnet of a computer device manufacturer, value-added reseller, integrator and so forth which are configured for system image loading. Only the image options available on the network are shown to the user when selecting a desired image configuration.

The actions and trees of actions utilized within MINDS allows a process to be put together from individual task (actions). The order of the tasks can be readily altered with actions added or removed as desired. The internal action tree structure of MINDS allows the same executable to be executed in multiple steps of a given download process. All instances of the-actions in the action class run asynchronously from the management class, with actions sending messages back to the management class (e.g., completed, error, warnings, and so forth). Actions can be performed within a separate thread to reduce latency problems, in particular if the action is protracted or intensive in nature.

In a preferred embodiment, a single executable is controlled in MINDS v2 in response to external setting files as opposed to executing a number of separate executables. Unless otherwise specified, the following descriptions of MINDS relate to MINDS version 2 according to the present invention.

Dynamic link libraries (DLLs) are used with a single MINDS executable which increases reliability and ease of testing. Unlike prior systems, the new MINDS system can be configured at the point of use for a specific download process based on performing dynamic binding of actions prior to the download process being enacted. For example, in adding a new action, information is added to string tables and a list of actions with any user interaction being defined for the action. It should be readily appreciated that changing these bindings is not the same as editing code within the system. Thorough testing is warranted whenever coding changes are made as even a single errant line of code could make the program unworkable, or worse yet create errored or misrepresentative images. However, when only the bindings are changed there is no further need to test the software as each module being bound has already been thoroughly tested. Elimination of the testing step can save significant resources, especially in an environment where configurations change often.

The use of action trees provide the mechanism for creating rapid change without recompiling the code. One or more action trees can be defined, with each action tree typically comprising a plurality of tree nodes that each include one instance of an action. Each tree node includes an action as well as pointers defining a relationship within the tree. By way of example and not limitation, one embodiment is described in which a child relationship and a next sibling relationship are supported by the pointers within the tree structure. Every node thus has two pointers, one pointer directed deeper toward the next child node and one pointing sideways to the nearest sibling node. This arrangement of the tree simplifies tree traversal, such as via recursion, while conserving memory. The actions are controlled by a managing class and are launched as separate threads.

The code is divided into multiple layers, for example user interfaces, infrastructure (or managing layer), and the set of individual actions. The separation allows the individual actions to be reused in other applications, while the user interface operations can be performed for a group of actions and/or for separate actions. The managing layer directs the specific actions to be performed, with information traversing from the managing layer to the trees and not the converse. It should be appreciated that the same managing code is used regardless of the actions being performed, wherein upgrading and testing of the software is greatly simplified. For a given build, a selection process takes place to determine which action tree is to be executed. For example, the user interface can allow the user to select the action tree, or to use a default if only one action tree is specified, or in response to elapsing of a sufficient period of time without receiving a user response.

In one embodiment the functionality of the MINDS system is separated from the user interface to increase flexibility in the use of the MINDS core.

According to one mode of the system every action performed during the MINDS session is logged, such as into VSMS, preferably including date and time, action, person logged on, and information about the systems configured.

The MINDS apparatus and method can be utilized in a variety of imaging applications, such as for development work, software distribution as an MIS (management information services) function, and so forth. For example, the modules can provide for selective imaging of software onto systems in response to special licensing, information about the systems themselves, department information, and/or other information available at the time of image creation.

The invention is amenable to being embodied in a number of ways, including but not limited to the following descriptions.

According to one embodiment of the invention an apparatus is described for automated configuration of software program images on a computer, comprising: (a) a modular network downloading program configured for accessing image files from a network to configure program images on a computer; (b) a plurality of action routines each configured for performing a specific operation within the modular network downloading program; and (c) means for defining a tree of the action routines to be executed by the modular network downloading program.

The action routines are dynamically linked to the modular network downloading program, wherein recoding, compilation, and testing is not required in order to modify the set of actions to be performed, or to create new sets of actions associated with new modes, or new PC configurations. It is preferred that the tree of action routines is created with textual configuration files. The modular network downloading program preferably comprises: (i) a management layer configured for executing actions during traversal of the action tree; and (ii) a user interface configured for controlling the operations of the management layer for the desired automated installation being performed.

Another embodiment of the invention can be described as an apparatus for automated configuration of software program images on a computer, comprising: (a) an action tree layer having a plurality of actions which may be dynamically linked and then executed during automated software installation; (b) at least one action tree having a plurality of nodes each of which contain at least one pointer to an action from the action tree layer; (c) a management layer configured for executing actions during traversal of the action tree; and (d) a user interface configured for controlling the operations of the management layer for the desired automated installation being performed. The actions are functionally independent and can be reused within a given action tree and across different action trees. In addition, actions can be launched within separate execution threads thereby allowing the system to respond quickly to the user while it is still in the midst of executing a lengthy action step.

The program images created by the MINDS software comprises either a single foundation image or more typically a combination of a single foundation image with at least one application program module. However, it will be appreciated that the MINDS system can support more than one foundation image, although currently this has little practical value.

Any desired number of different actions can be executed from within the action trees. By way of example the actions supported in this embodiment can be selected from the group of processing actions consisting essentially of: creating an Mcode media, uploading Mcode from the desktop management interface (DMI) of a system, downloading a foundation image to a system hard drive, downloading an application module image to a system hard drive, uploading a foundation image from a system hard drive, uploading an application module image from a system hard drive, recover a foundation image from a recovery partition, media version verification, blitter, assign target drive, select base unit, clean up image removing unnecessary files, copy images to recovery partition, copy modules to partition, create image CRCs, create Mcode floppy, display splash screen, display desktop management interface comparison, eject media, find correct target drive, get hard drive information, verify if on network subnet, end logging session, map network drives, partition query, partition hard drive, restart, restricted login, return to main menu, verify that image components exist, and create thread. Any number of additional or different actions can be created to support image downloading or other activity according to an embodiment of the present invention.

According to another embodiment, the invention may be described as a method of configuring computers with software program images, comprising: (a) creating and compiling a set of separately executable actions for performing image configuration actions on a computer; (b) creating and compiling a management layer which executes actions defined within a selected action tree; (c) creating and compiling a user interface layer which controls action tree selection and progress through the action tree; (d) creating an action tree structure having a plurality of nodes which include pointers to actions and to other nodes in the action tree; and (e) linking the actions, management layer, user interface and action tree into a program which executes actions defined in the action tree according to user input.

The tree structure preferably comprises nodes connected according to a child pointer relationship, sibling pointer relationship, or more preferably a combination of child and sibling pointer relationships with one another. The pointer relationships within the action tree preferably comprises a pointer to node locations in the action tree at which the pointer to the action is located. Preferably executed actions are tracked by the stack, which provides a convenient mechanism to allow the user to return to any prior process step. The use of the stack is preferred over the inclusion of parent node pointers within the action tree.

A number of benefits are derived by implementing the new MINDS system, including but not limited to the following.

An aspect of the invention is to provide a modular imaging network download system whose actions can be more readily adapted.

Another aspect of the invention is to provide a network download system in which actions can be added or removed from action trees which are dynamically linked.

Another aspect of the invention is to provide a network download system in which the user can back up to any prior action.

Another aspect of the invention is to provide a network download system in which the user can pause, step through, and resume process steps.

Another aspect of the invention is to provide a network download system having improved error handling.

Another aspect of the invention is to provide a network download system which can support more comprehensive user interfaces with an increased number of supportable options.

Another aspect of the invention is to provide a network download system which eliminates the need for multiple versions of the network download programming media (i.e., CDs) depending on department (e.g., factory floor, engineering, service, testing, quality assurance, and so forth).

Another aspect of the invention is to provide a network download system that interacts directly with the software management system (SMS).

Another aspect of the invention is to provide a network download system which can support different types of images, for example foundation images, monolithic images, base-plus images, and images using Ghost.

Another aspect of the invention is to provide a network download system which can be adapted to use a small operating system, such as the scaled down pre-installation version of Windows XP known as WinPE.

Another aspect of the invention is to provide a network download system which can only be executed from within a designated network subnet, thus preventing misuse outside of the manufacturer facility.

Another aspect of the invention is to provide a network download system which copies a complete bill of materials (BOM) to the target system.

Another aspect of the invention is to provide a network download system which can utilize a system UUID as the default for creating Mcode floppies.

Another aspect of the invention is to provide a network download system which provides a separate selection at the main menu for creating Mcode floppies.

Another aspect of the invention is to provide a network download system that is capable of uploading images from existing systems.

Another aspect of the invention is to provide a network download system which supports a number of different operating modes, such as unattended, factory, SKU selection, advanced, foundation image upload, freestyle image upload and download, and so forth.

Another aspect of the invention is to provide a network download system in which users must be authenticated prior to executing any actions.

Another aspect of the invention is to provide a network download system in which new action trees can be defined without recompiling and testing.

A still further aspect of the invention is to provide a network download system in which all user selections and interactions are performed prior to executing any actions.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL
VIEWS OF THE DRAWING(S)

The invention will be more fully understood by reference to the following drawings which are for illustrative purposes only:

FIG. 16 is a screen shot image of an example module and switch selection screen according to an embodiment of the present invention.

DETAILED DESCRIPTION OF THE INVENTION

Referring more specifically to the drawings, for illustrative purposes the present invention is embodied in the apparatus generally shown in FIG. 1 through FIG. 16. It will be appreciated that the apparatus may vary as to configuration and as to details of the parts, and that the method may vary as to the specific steps and sequence, without departing from the basic concepts as disclosed herein.

The modular imaging network download system, referred to herein as MINDS, is the Sony designed and developed solution for rapid deployment of the entire software aspect of a PC. Although the process of placing software on a particular PC appears simple, those familiar with the process realize that the current process is neither simple, static, or speedy (rapid). In order to meet goals with respect to simplicity, speed, flexibility, overhead reduction, and reliability the MINDS v2 system was a complete redesign, from the ground up, of the prior MINDS v1 modular download system. As a result, the design does not have the limitations or problems of the previous solutions.

One goal of MINDS is to speed and simplify the process of incorporating software imaging changes in response to the application and/or user choices. The ease and efficiency of performing these functions according to the invention can provide significant benefits throughout the PC development, configuration, quality assurance, testing, and maintenance processes. The MINDS v2 system according to the present invention is designed so that changes to the process can be implemented rapidly and reliably. The design makes extended use of object-oriented programming principles of encapsulation, inheritance, and polymorphism. Thus the novel and important aspects of MINDS v2 (hereinafter referred to simply as MINDS) are not just what it does, but also how it does it.

Figure 1:
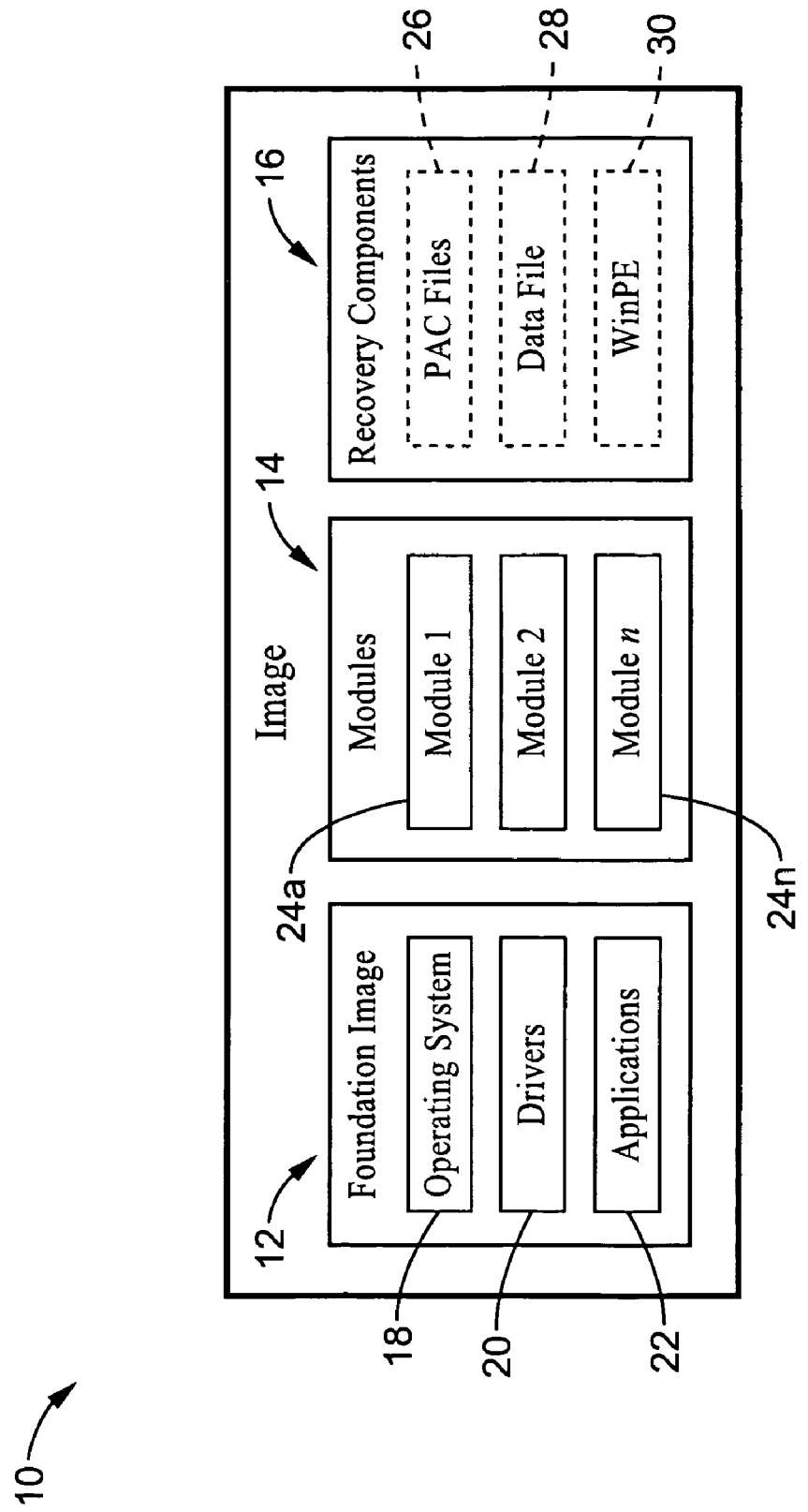
FIG. 1 is a block diagram of a software image downloaded onto a computer hard drive.

FIG. 1 illustrates a software image 10 for downloading on a computer (PC) system. The image is shown in this embodiment comprising a foundation image 12, software application module 14, and an optional recovery module image 16. The entire software package shipped on a PC's hard drive partition is referred to as an image. It should be appreciated that in some cases, at least at Sony, there are at least two partitions defined on the PC, at least one for customer use and a second hidden partition for recovery purposes, hereafter referred to as recovery components 16. These components must be placed on a system not only at the time of manufacturing for the customer, but also repeatedly during development and testing. An image can also be placed on a system using media kits which typically are a set of DVDs.

The primary component of an image is the foundation image 12. An image consists of one foundation image which contains the operating system 18, drivers 20, and applications and/or utilities 22 which are common to a particular set of hardware. Modules 14 are additional pieces of software that are added to the hard drive in support of specific installed applications from the PC manufacturer or more typically from third party suppliers, such as productivity suites (i.e., an application containing a word processor, spreadsheets, presentation software), browsers, email programs, sound card applications, media PC applications, and the like.

Any desired number of modules may be incorporated within the image, represented as modules 24a through 24n. Recovery components 16 allow the customer to recover the state of their PC as it was when it shipped from the factory. The recovery components for example may comprise a compressed and packaged set of the files (referred to generally as PAC files) which are needed to restore project-specific applications on the hard drive after the foundation image is restored. The data file 28 is a modular executable containing project-specific configuration files necessary for recovery of applications using PAC files or modules. The WinPE file 30, or similar, is a small operating system which can be utilized in the restore process. It should be appreciated, therefore, that although the concept of placing various components together to create an image is simple, the actual implementation is complex, consisting of many steps.

Figure 2:
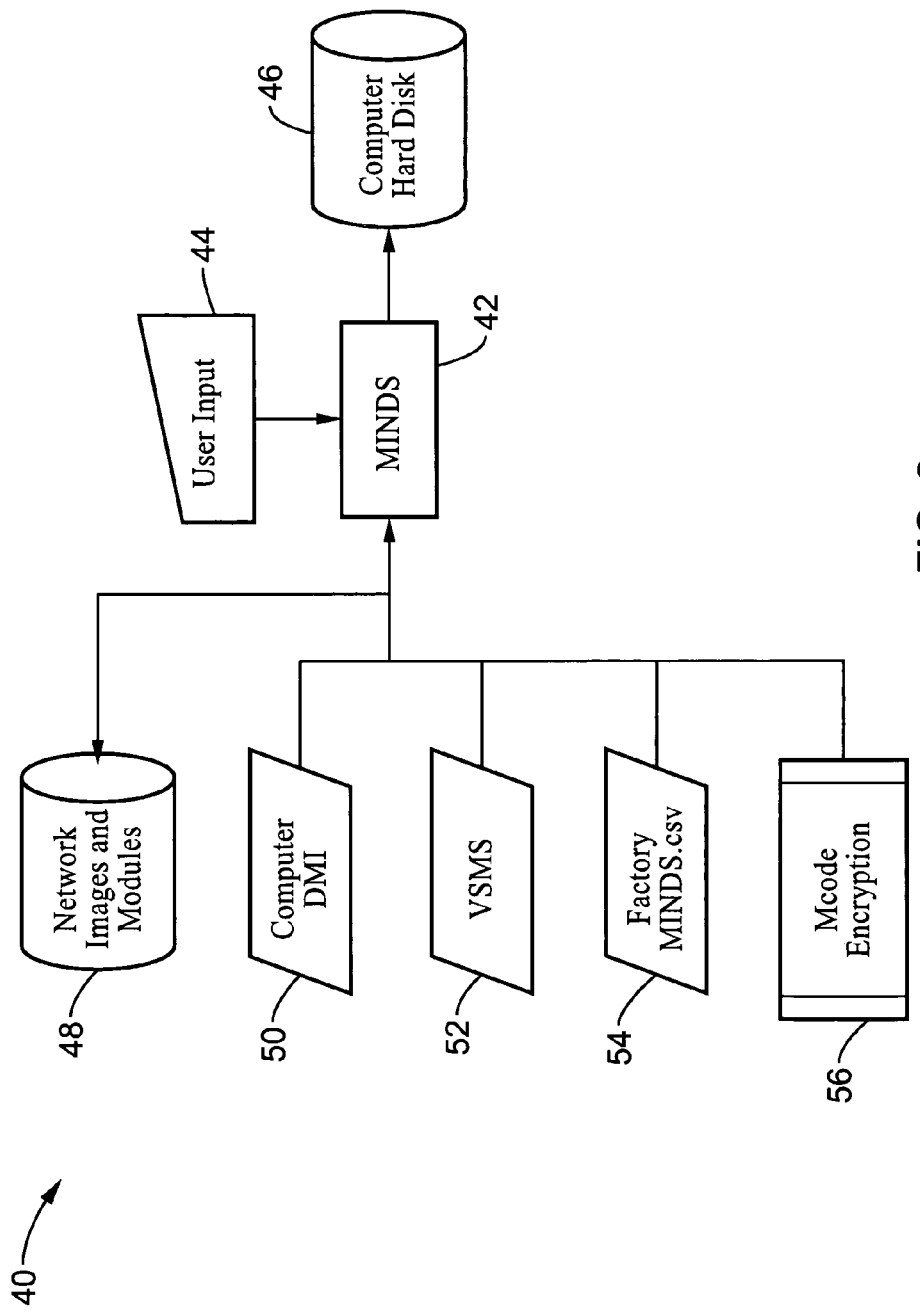
FIG. 2 is a block diagram of inputs and outputs for a modular network download system according to an embodiment of the present invention, showing network resources on the left interacting with the MINDS program.

FIG. 2 illustrates by way of example a download system 40 having the MINDS software 42 and user interface 44 which is configured for downloading an image to hard drive 46, or less preferably uploading an image from the hard drive. In a preferred embodiment, the MINDS system is operated in conjunction with a local network, or subnet, providing access to databases and functionality of the organization operating the MINDS system. In this case the network includes a repository 48 of network images and modules for the imaging process, desktop management interface (DMI) data repository 50, software management system (SMS) 52, factory information 54 (i.e., MINDS.csv), and Mcode encryption data 56.

Figure 3:
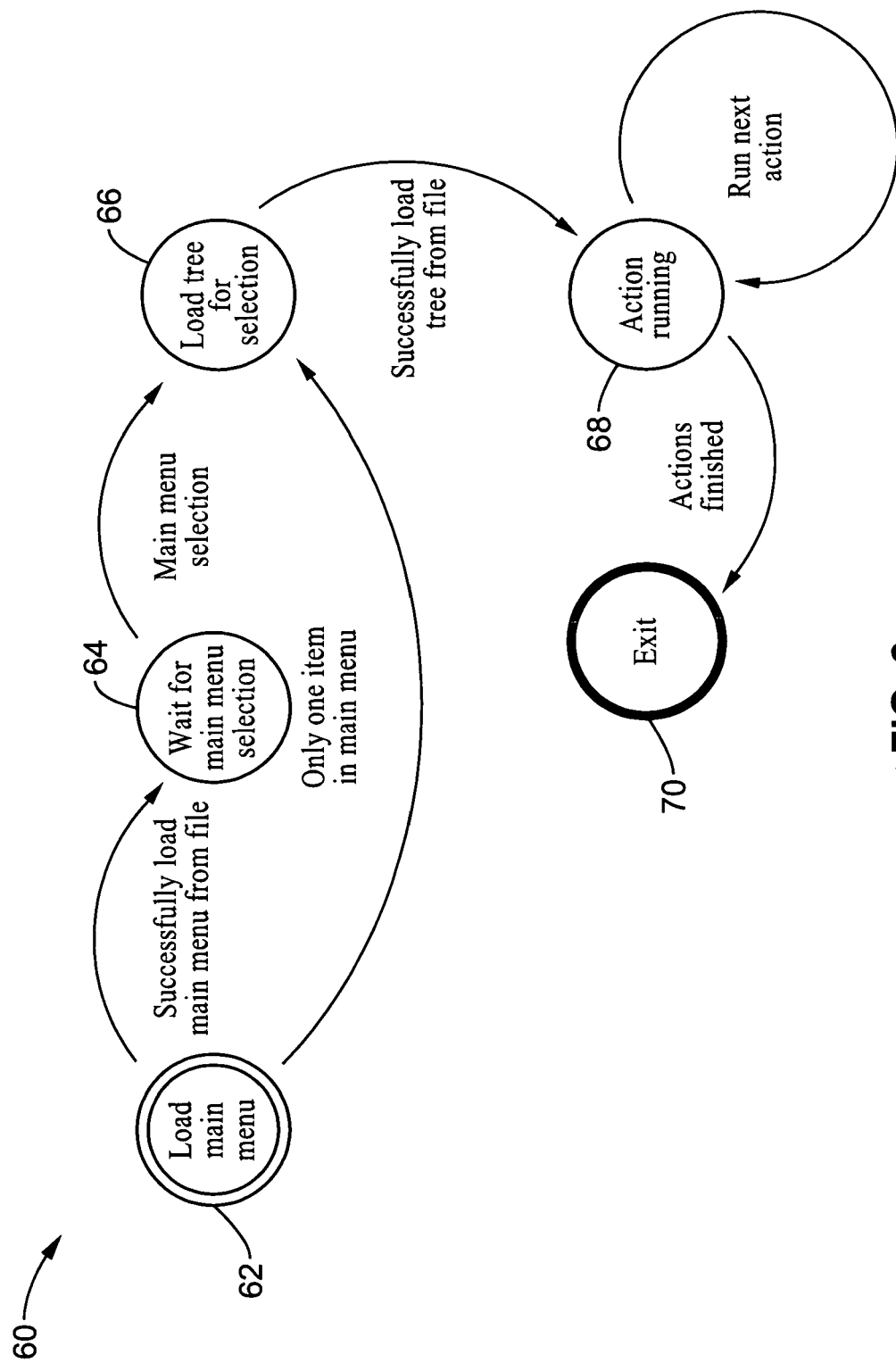
FIG. 3 is a flow model of a modular network download system according to an embodiment of the present invention.

FIG. 3 illustrates by way of example the general operational flow 60 of the MINDS system process. The main menu is loaded at node 62 and the system awaits user menu selection at node 64. If only a single menu item exists, or if an allotted time has passed without making a selection, a default mode is selected wherein node 64 is bypassed. At node 66 the action tree is loaded for selection, wherein user information can be collected. If the actions and selection are valid then the process moves to node 68 which runs sequential actions within the action tree. One mode of the invention allows the user to pause (break) and resume execution of the process, as well the ability to step through process steps or even to go back to a previously executed step, such as to change a selection made for that step and continue from that point on, thus not requiring the user to repeat the entire sequence of steps. Once the actions in the action tree have been executed then the action tree exits to node 70.

Menu selection in node 64 of FIG. 3 can provide for any number of action tree selections, typically associated with operating modes for the MINDS program. In addition, the menu may be nested, to provide selection over a larger number of modes, for example with broad categories of operations on the first screen which lead to specific modes within the selected category. It should be appreciated that any form of selection front end may be utilized without departing from the teachings of the present invention.

In one embodiment of the invention MINDS v2 provides different modes of operation to eliminate the need for parallel versions that were required by MINDS v1. These various modes provide fully autonomous operation or allow for a user to select how much control they want to exercise during the imaging process. The modes with more user control help to aid in debugging and troubleshooting, while those with less control are more suited to automated processes and use in areas, such as manufacturing, where it is very important to control hard drive imaging. Additionally, these different modes of operation allow for different processes, such as imaging in the factory, to be emulated. When the factory process is emulated, the same data source is relied upon that the factory uses, which results in more accurate testing and allows for certain types of errors to be caught before reaching the factory.

One mode of operation is referred to herein as "Unattended Mode" that automatically starts if the user does not interact with MINDS after loading (thus bypassing node 64 of FIG. 3). This mode of operation performs the entire imaging process with no user input-other than the initial loading of MINDS. To obtain what image components to use, unique image component identifiers are retrieved from the Desktop Management Interface (DMI) of a given system and matched with project information in VSMS. The value of this mode of operation is that it requires only a few seconds of engineering time for the engineer to download an image. The decrease in average engineering time, especially in unattended mode, is an important benefit of MINDS v2. Consequently, hundreds of engineering man hours can be saved every year. In addition, the systems are available sooner for testing since the total imaging time is also decreased, which equates to tangible savings.

The complex process of imaging a system is constantly changing and MINDS v2 was designed with this reality in mind. The code is structured in such a way that changes can be implemented rapidly and reliably. Typically, changing the mix of image sets and configuration to be downloaded does not require recompiling the MINDS code. In addition, the design of MINDS is extremely flexible, allowing rapid changes and maintenance.

It was found during the use of the earlier MINDS v1 that the imaging process is continuously evolving and requires frequent software changes in the image download program to support new systems and new system configuration changes or options. It should be appreciated that the MINDS functionality in many cases must be changed if any new foundation image is needed, such as are associated with new hardware, or if any new software becomes available for the system. Thus the goals in the design of MINDS v2 were to make this maintenance easy and quick as well as reliable.

A fundamental concept in MINDS v2 is the concept of actions and action trees. Actions are functionally independent pieces of code that perform one task, such as partitioning the hard drive, prompting the user for certain input, or reading the DMI. Since each action preferably performs a single task (i.e., or less preferably a collection of closely related elements) the behavior of each action is kept separate from other actions and coupling between them is minimized. Having the actions perform atomic operations provides significant reduction in coupling which is a key objective of modern software engineering.

Figure 4:
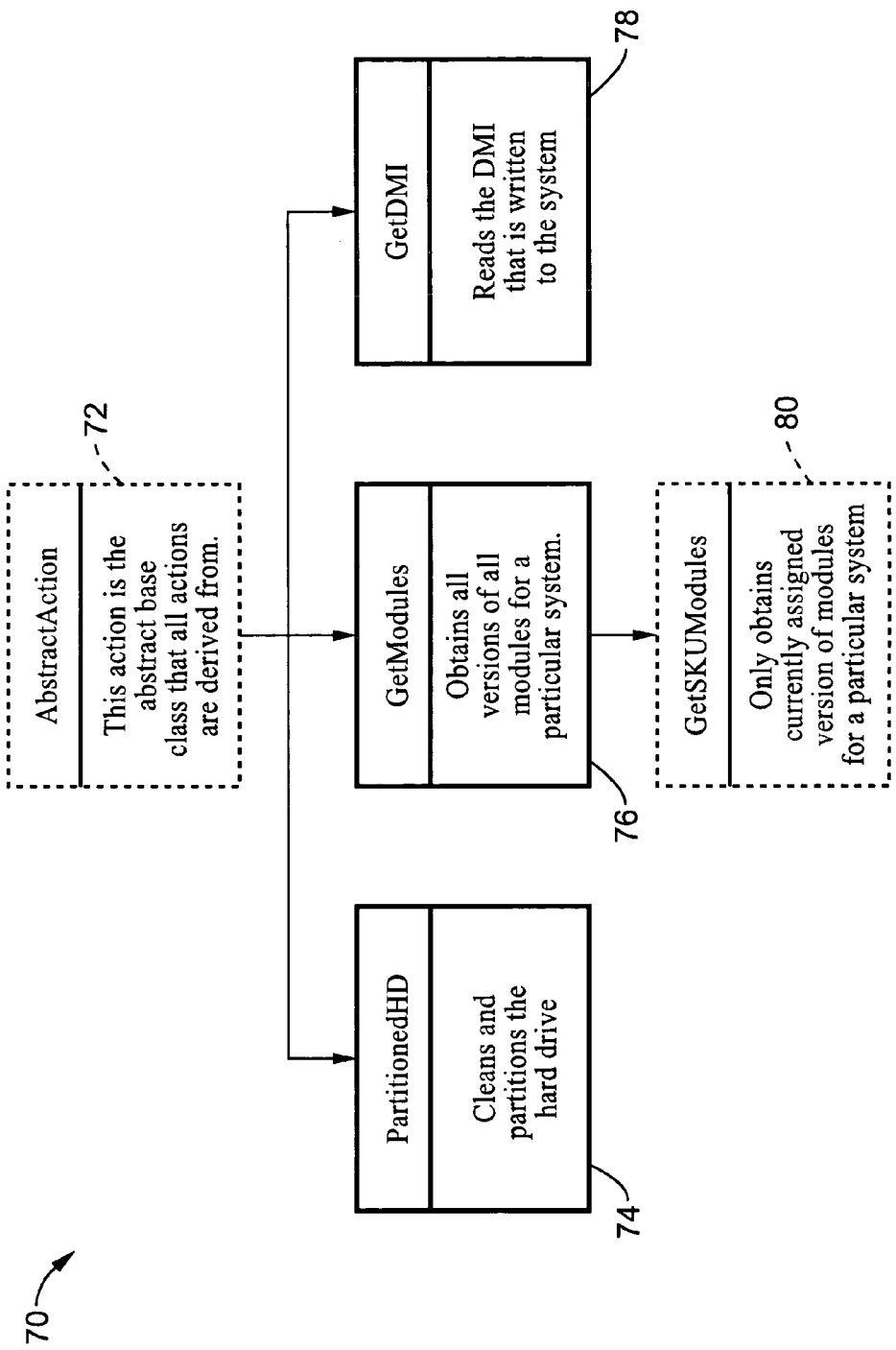
FIG. 4 is a class hierarchy model of the modular network download system according to an embodiment of the present invention.

FIG. 4 illustrates by way of example embodiment a class hierarchy 70 for a set of actions. The actions are preferably all derived from an abstract base class, herein referred to as AbstractAction 72. By using an abstract base class there is a minimal set of behavior that is common across all actions. These common functions defined in AbstractAction are pure virtual functions, so dynamic binding is performed to select the proper function to execute. Actions can also be derived from other actions which provides numerous advantages. First, by deriving actions from other actions, functionality can be changed without altering the parent action, thus isolating changes and promoting well engineered software maintenance. Additionally, a hierarchy of actions can be created so that functionality common to a group of actions can be encapsulated in one action or abstract base class action.

Inheriting aspects of the abstract action class are a partitioned HD class of actions 74, a GetModules action class 76, and a GetDMI class of actions 78. Partition action class 74 is configured for performing HD cleaning and partitioning operations. GetModules action class 76 obtains all versions of all modules for a given system. The GetDMI action class 78 reads the DMI that is written to the system. An additional action class, GetSKUModules 80 is shown derived from the GetModules class 76 for obtaining currently assigned versions of modules for a given system. It should be appreciated that the above action classes are shown by way of example only, there may be defined any desired number of classes within the hierarchy without departing from the teachings herein. The class hierarchy can be defined with few or many layers depending on what elements the actions have in common and the extent to which the programmer wishes to capitalize on that inheritance.

Figure 5:
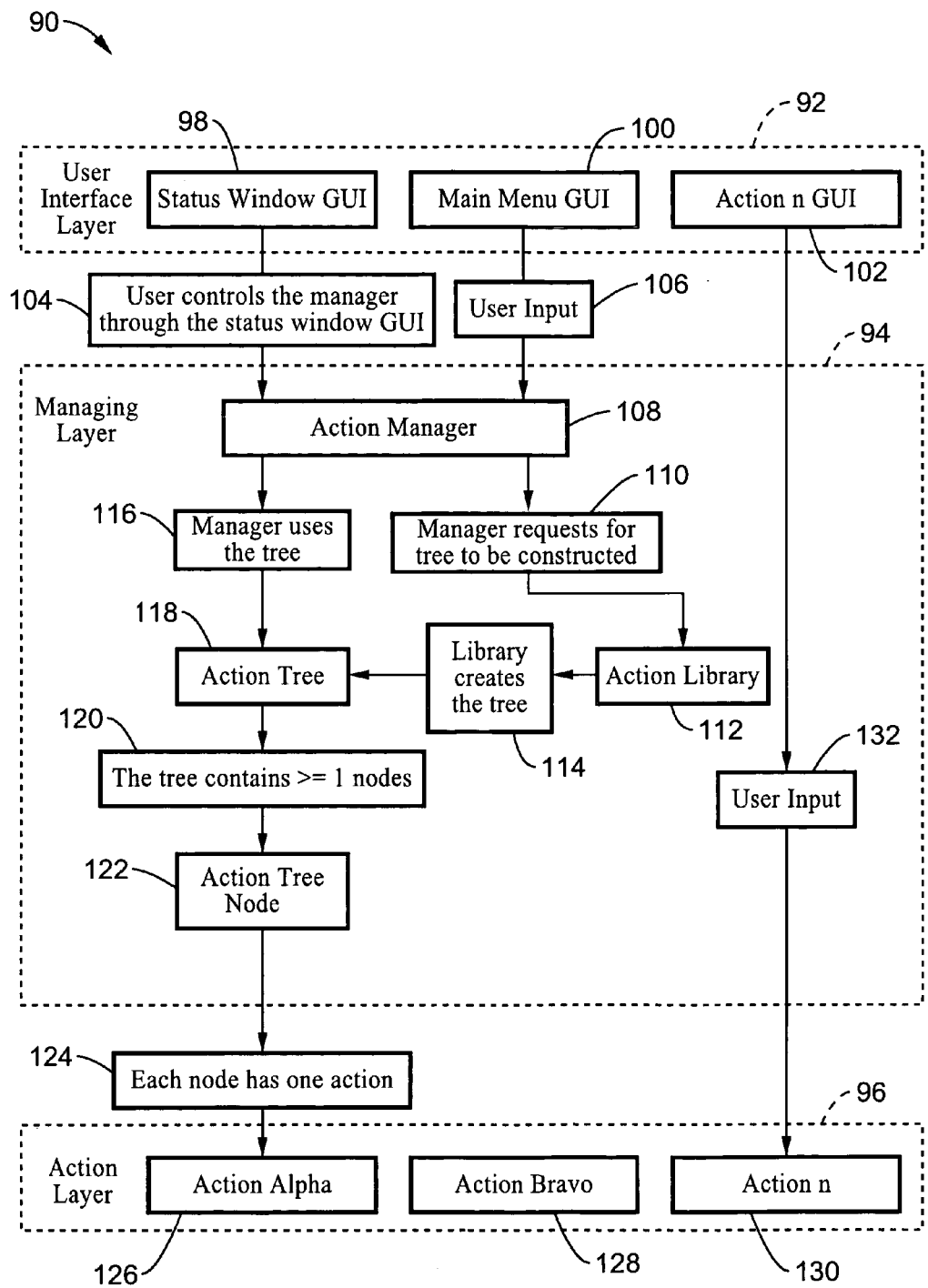
FIG. 5 is a block diagram of layers within the modular network download system according to an embodiment of the present invention, showing a user interface (UIF) layer, managing layer, and action layer.

FIG. 5 illustrates by way of example layering of the MINDS executable 90 into an upper-most GUI layer 92, middle managing layer 94 and low level action layer 96 having the action library, action tree and actions. Partitioning MINDS into these different layers offers numerous benefits as interaction is controlled through interfaces between layers, while changes are typically isolated to one layer further reducing risk and increasing reliability. It will be recognized by one of ordinary skill in the art the system can be partitioned into any desired number of layers without departing from the teachings of the present invention.

It should be appreciated that GUI layer 92 can be less preferable made optional, with its functionality being supplied externally to the MINDS systems or from within the individual actions. This embodiment illustrates components of the GUI comprising a status window GUI 98, main menu GUI 100, and action "n" GUI 102. GUI layer 92 is associated with manager layer 94, although it may also be coupled to other executables to provide a synergy between strictly imaging of systems and other related operations.

Between the GUI layer 92 and management layer 94 is shown activities exemplified as a user controlling the manager through a status window 104 and user input being received at block 106.

The middle layer is the managing layer 94, which contains the manager itself, the action library, and the action tree. The manager is the executable that directly or indirectly controls all the other parts of the MINDS system, including actions, action tree, nodes in the action tree, and the action library.

The manager has an instance of an action tree, which is created by the action library from an editable text file on request.

The manager controls the sequencing of actions within the action trees and ties that in with user interaction. When an action successfully finishes it signals the manager of that condition. In this way the manager can determine if a leaf in the action tree has been reached, if there are more actions to execute, or if the action tree has finished executing. If there are still actions to execute, then the manager normally signals back to the tree to execute the next action. After an action has been told to run by the manager, the manager will pend waiting for the signal that the action has finished.

The example embodiment of manager 94 is shown with an action manager routine 108 which can control both action tree building and action tree execution. Action tree building is shown as per block 110 from actions within an action library 112 to form an action tree 114 for being executed.

Action tree execution is shown starting at block 116 in which the manager is initialized to a given tree and executes the action tree which has been built as per block 118. As long as at least one node of the action tree remains, as determined by block 120, actions are selected as per block 122 and each node performs a single action whose code resides in action layer 96. The manager also is shown interfacing user interface layer GUI 92 through user input block 132 with the actions, depicted as action n at block 130.

The lowest layer is the action layer 96 which contains the precompiled actions, depicted as action Alpha 126, Bravo 128, . . . through action "n" 130. It should be appreciated that each action within action layer 96 preferably comprises a single (atomic) action. The action tree has one or more nodes, with each node in the action tree pointing to an instance of one action. It should be remembered that each separate action may also have its own GUI.

These various GUIs preferably provide the interface for the user to communicate with the MINDS system.

Figure 6:
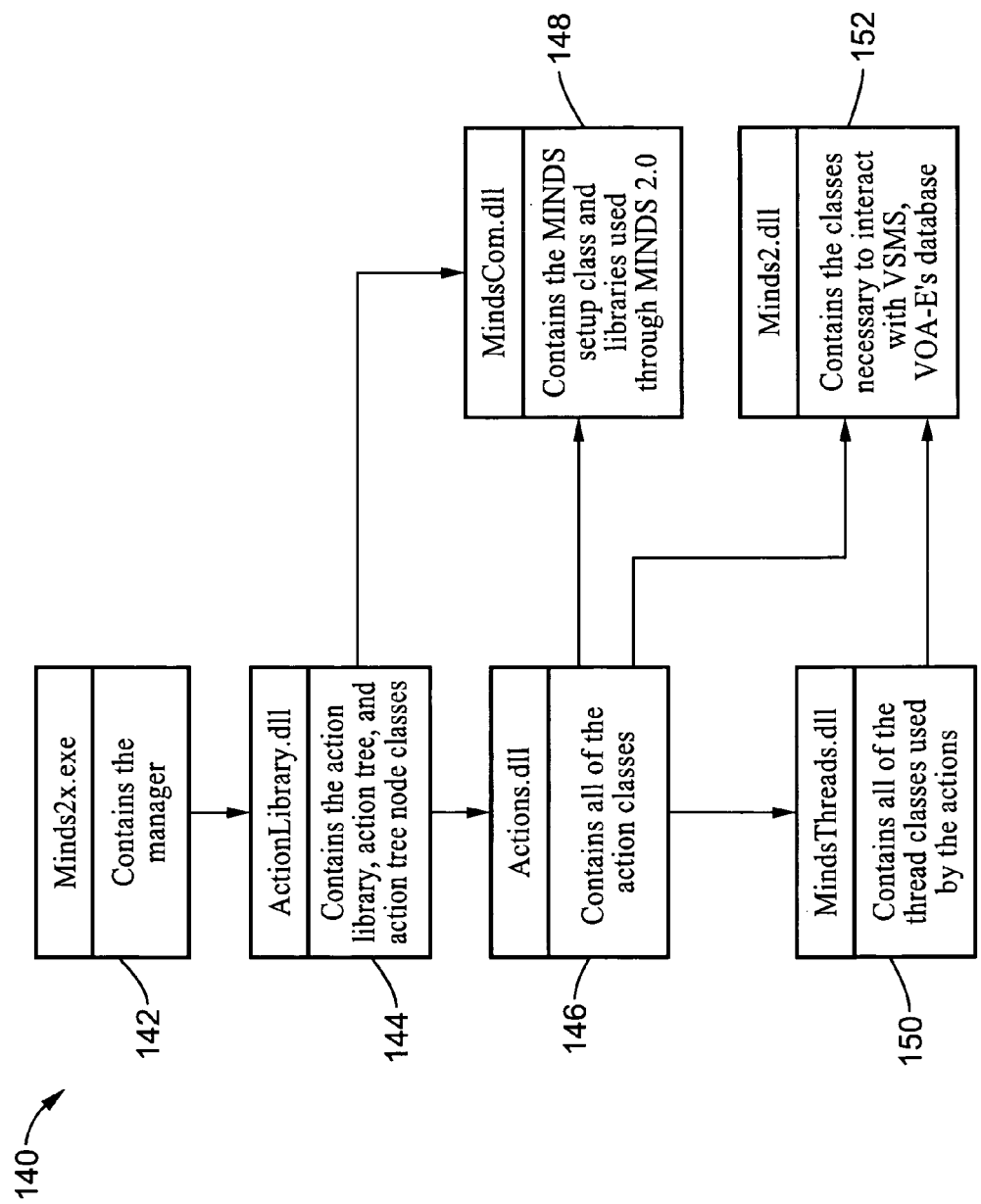
FIG. 6 is a block diagram of modules within the modular network download system according to an embodiment of the present invention.

FIG. 6 illustrates an example of modules 140 which fit into the layered structure described in FIG. 5. The MINDS executable, referred to herein as MINDS2x.exe 142, contains the code for the management layer. It should be readily appreciated that this code need not be modified for each new build operation. The action library contains the action library, action tree, as well as action tree node classes, referred to herein as Actions.dll 144. The set of available actions within the action classes are depicted as within Actions.dll 146. Setup classes and libraries used throughout the MINDS system are referred to herein as MindsCom.dll 148, which associates with both the ActionLibrary.dll 144 and Actions.dll 146. The thread classes for controlling the activity of program threads which have been spawned are depicted within MindsThreads.dll 150. The classes necessary for interacting with the SMS system to the image configuration data base, is depicted as Minds2.dll 152, which is shown associating the Actions.dll 146 and MindsThreads.dll 150.

Figure 7:
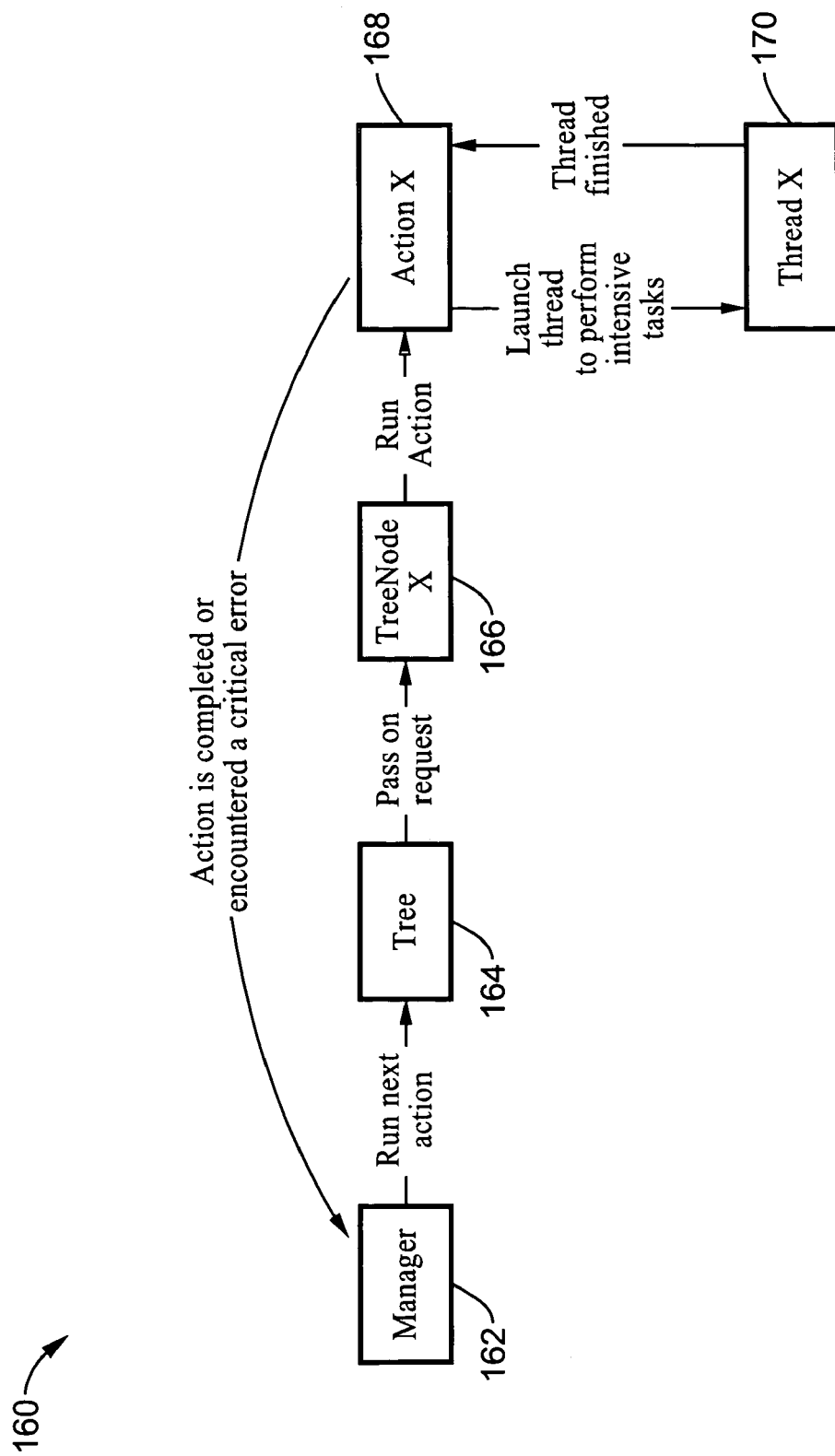
FIG. 7 is a flowchart of manager layer requesting actions to run according to an aspect of the present invention.

FIG. 7 illustrates how the manager layer controls actions 160 such as requesting actions to be run and being notified when the actions are finished. The manager is executing at block 162 and runs the next action in the tree at block 164. Requests can be passed to additional tree nodes as per block 166 which commences running the action X as shown in block 168. A thread may be created for the action as per block 170, to improve user interface responsiveness, which is particularly well suited for use with resource or time intensive activities (e.g., downloading/uploading files between the network and the hard drive, and so forth). Completion of the thread is depicted as action X is completed. Critical errors from the action are shown causing a return back to the manager. The return to the manager is preferably performed by passing a message to the manager. In fact, according to one embodiment each executing action passes a message back to the manager (note message passed from block 168 to block 162) to notify the manager of successful completion or of a specific failure. On receiving a critical failure message the manager determines that the program cannot continue and stops processing further actions within the action tree. As in FIG. 12 a dialog box can be displayed for the error message which allows the user to select whether the manager should stop completely as recommended or to continue despite the warning.

As seen in the above figure, multithreading is another software engineering concept that is utilized by MINDS. If an action is going to perform an intensive task, such as downloading a foundation image, a thread is launched to perform the intensive task. By launching a separate thread the action is free to respond to other requests. In the embodiment MINDS does not use multithreading of actions, but executes actions asynchronously. The principle purpose of the "multithreading" performed within MINDS is for the benefit of the user experience, wherein the system is made more responsive to the user. While MINDS is executing an action, such as copying files from the network using one thread, the user can still view status information and start or stop the process because that uses another thread. Conversely, if MINDS had used only a single thread then the entire program and the monitor display would be locked up and not allow any user interaction or progress display when copying files from the network. When a thread is finished a message is sent back to the manager notifying it that the thread has completed. The end result is that the system is more responsive to conditions. It should be appreciated, however, that similar asynchronicity of user action can be obtained with true multithreading, multitasking, interrupts, or other mechanisms known to those of ordinary skill in the art.

Instances of actions are grouped into logical trees that are called action trees. Particular modes of operation in MINDS correspond to distinct trees of actions. This means that a particular imaging process becomes either a separate action tree or a specific path through an action tree. The user selects which mode of operation to perform from a main menu that appears when the execution of MINDS begins. If no selection is made within a given period of time (i.e., three minutes), then the default mode of operation is executed. The default is typically an unattended mode which allows performing a common operation repeatedly.

Figure 8:
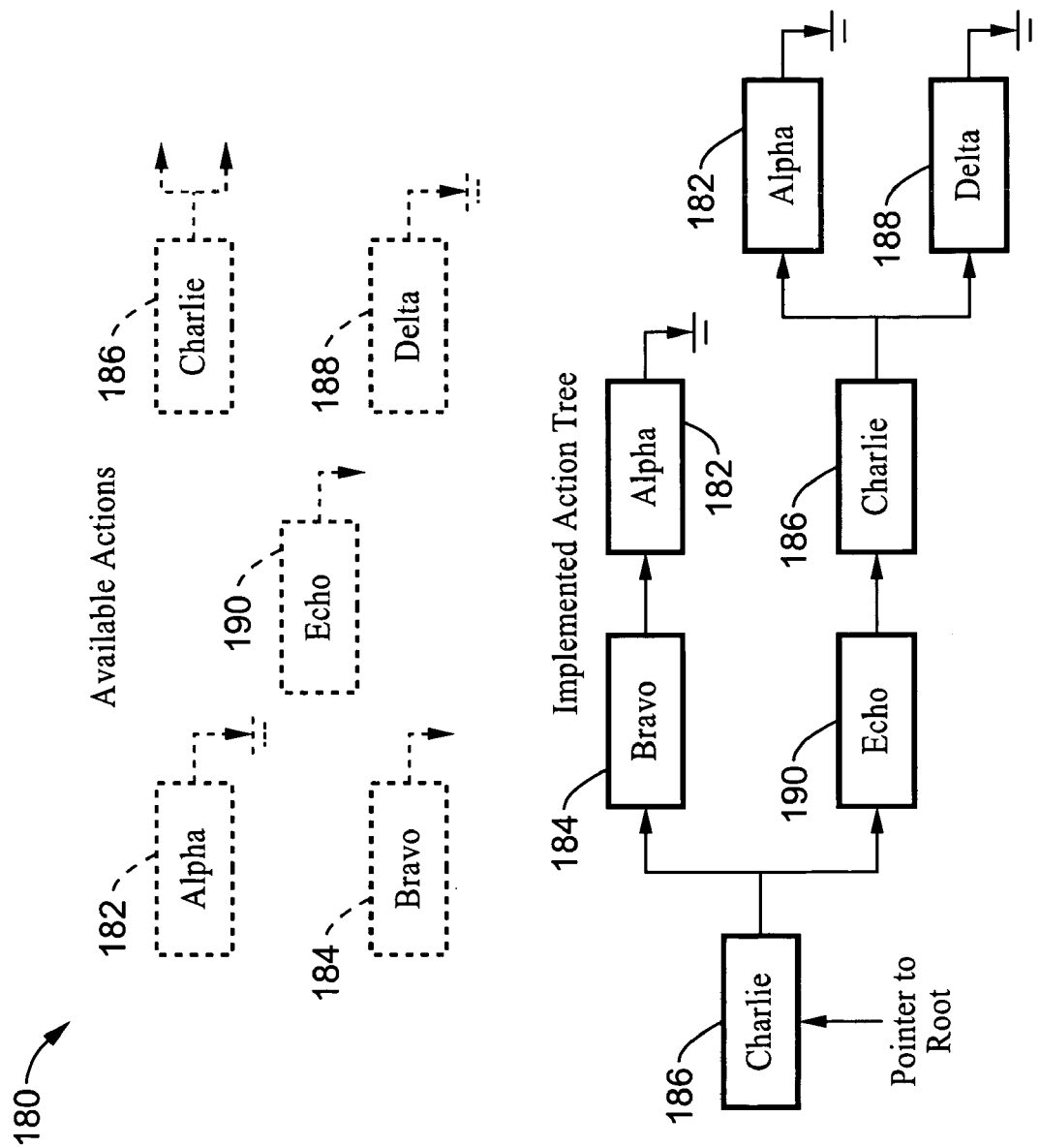
FIG. 8 is a tree model of interconnected actions according to an aspect of the present invention, showing available actions and an example of an implemented action tree using instances of those actions.

FIG. 8 illustrates an example of actions being organized into action trees 180. Available actions are represented by actions Alpha 182 through Echo 190, although any number of actions may be available (typically for more than five actions). The available actions shown in the upper portion of the figure are depicted with dashed lines, as these what is available in the action library. The lower portion of the figure depicts the actions which have been linked from the library into an executable action tree according to the present invention. In this example the action tree has action Charlie 186 as its base and splits off to a first branch with actions Bravo 184 and action Alpha 182 before termination, and a second branch with actions Echo 190, followed by action Charlie 186 which then branches into either action Alpha 182 or Delta 188. It should be appreciated that each action may be instantiated any desired number of times, as the coding for the actions in the action library is reentrant (although non-reentrant actions can be supported, such as for specific functions).

Each action in the action tree designates the exact number of child actions it can have in the action tree. These child actions are ordered and assigned sequential numbers. When an action is finished it is queried to determine which child, or sibling, action should be run next. This query is replied with a response that says which action to run next. It should be noted that in the preferred embodiment actions do not specify a specific action to run next, only which number, wherein the actions remain independent of one another.

For example, consider that case in which there is a message box that is a dialog with two buttons, yes and no. Clicking on one of these two buttons causes the action to finish. When the action tree queries the message box that has finished about which child action to run next it only replies with "run child 1" if yes was clicked or "run child 2" if no was clicked. The action does not reply with "run the module copy action next". As a result any action can be designated as the child of any other action, as there is not a set ordering or binding of certain actions together in a particular hierarchy in the action tree. It will be understood that the action tree itself contains all references to specific actions, while each of the actions responds back to the manager in a "generic" manner, in the above example providing a number which is interpreted in relation to the action tree and the pointers defined therein.

Each action is independent of other actions, but the actions communicate in order to relay information between actions, such as user input. For example one action may ask the user which modules they would like to use for configured to order (CTO) imaging. The user response must later be conveyed to the action that copies the modules. According to one embodiment the solution to providing this communications is via the MINDS setup class. This setup class is a container for all information that might have to be relayed from one class to another. The action tree passes the MINDS setup class to each action as it is run.

Figure 9:
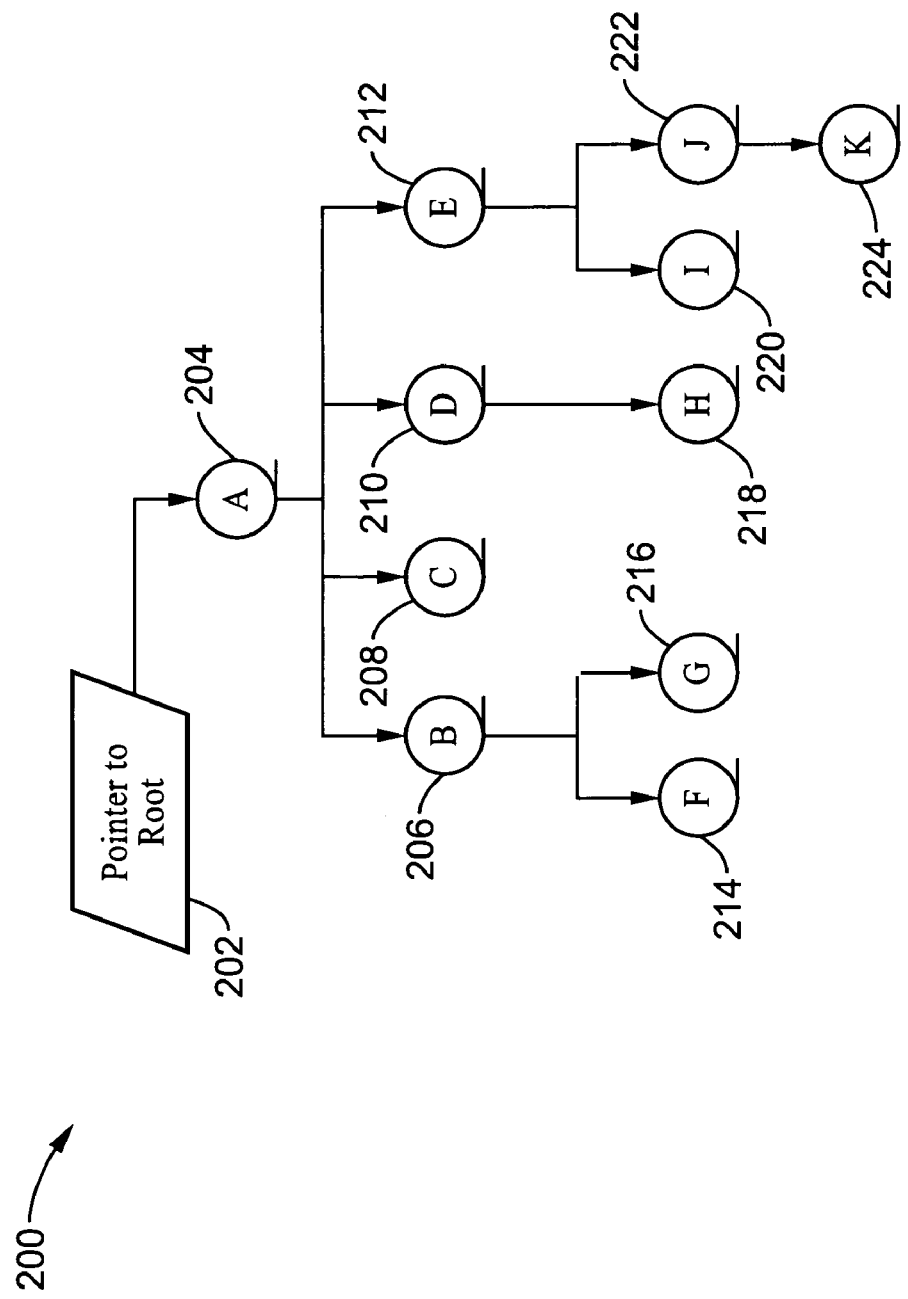
FIG. 9 is a tree diagram illustrating an action tree example according to an aspect of the present invention, showing a tree which only provides one or more child relationships within the tree.

FIG. 9 illustrates an example of an action tree 200 showing the flow of actions in a simple parent-child tree format. A pointer to the root at block 202 connects to action Alpha 204, which has four child actions, Bravo 206, Charlie 208, Delta 210, and Echo 212. The selection of child depends on DMI values, user input, and so forth. Other actions may be sequentially executed from each parent, as seen by actions Bravo 214 and Golf 216 executing as child actions of Bravo 206. Similarly, actions Hotel 218, India 220, Juliet 222, and Kilo 224 are coupled to respective parent nodes. It should be recognized, however, that the parent-child relationship as shown has shortcomings, for example how many pointers are to be reserved for each action, and how can recursion be performed through the tree. In this example, each action has a set number of children that it can have in the action tree and this number cannot be changed. There is then the problem of being able to define a tree that is logically incorrect, for example one that does not have the proper number of children assigned to each action. If a logically incorrect tree were used by MINDS the segments of the action tree could never be reached, or worse, certain nodes could specify that the next action to run is an action that does not exist wherein a crash may result.

Figure 10:
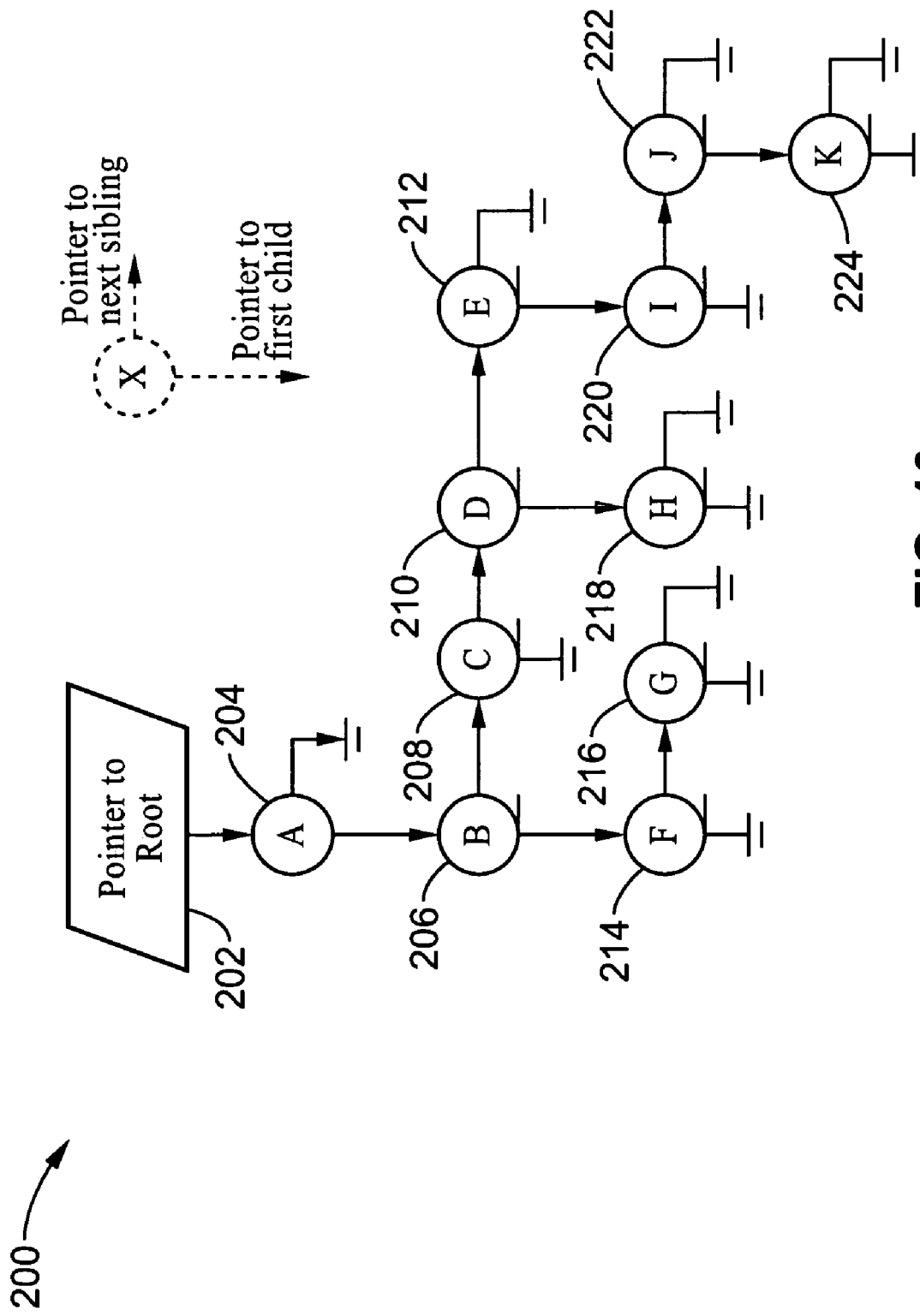
FIG. 10 is a tree diagram illustrating an action tree example according to an aspect of the present invention, showing a tree utilizing single child, single sibling relationships at each node of the tree.

FIG. 10 illustrates a preferred embodiment of the action tree in which the action tree is internally represented in what is known as a first child-next sibling method. Each action tree node configured with a pointer to a child (null if none exists), and to a sibling (null if none exists). In this implementation each node in the tree has two pointers: one to its first child and another to the next sibling, wherein only a small fixed number of pointers are required. In a preferred embodiment a history mechanism, such as utilizing the stack provides a number of benefits over the use of a parent pointer. The child-next sibling implementation provides several advantages, including conservation of action tree memory, since each node requires only two pointers. Another advantage is that navigating a path through the tree is a simple process, as is traversal of the tree via recursion. Scanning through FIG. 10 it can be seen that the same general structure is represented, however, the program can determine whether movement is vertical or lateral.

These trees of actions are stored in text files that MINDS reads at run time. It should be recognized that the tree contains "pointers" to actions and to other tree nodes, whereas neither the actions themselves nor the management layer itself directly references actions. By storing the various trees in these files the contents and ordering of the trees can be altered without the need to recompile any code. This allows for quick changes to be made to MINDS as long as the functionality of the actions does not have to be modified. The assembled trees are preferably checked for logical correctness prior to execution, wherein logically incorrect trees are preferably disallowed.

Figure 11A:
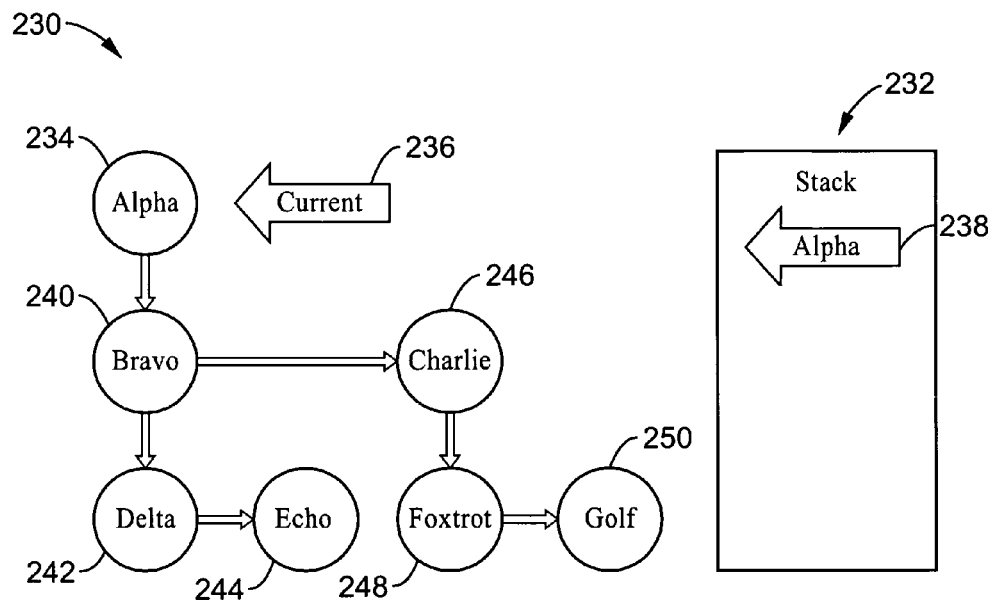
FIG. 11A-11E is a tree traversal example according to an aspect of the present invention, showing action execution relative to stack contents.
Figure 11B:
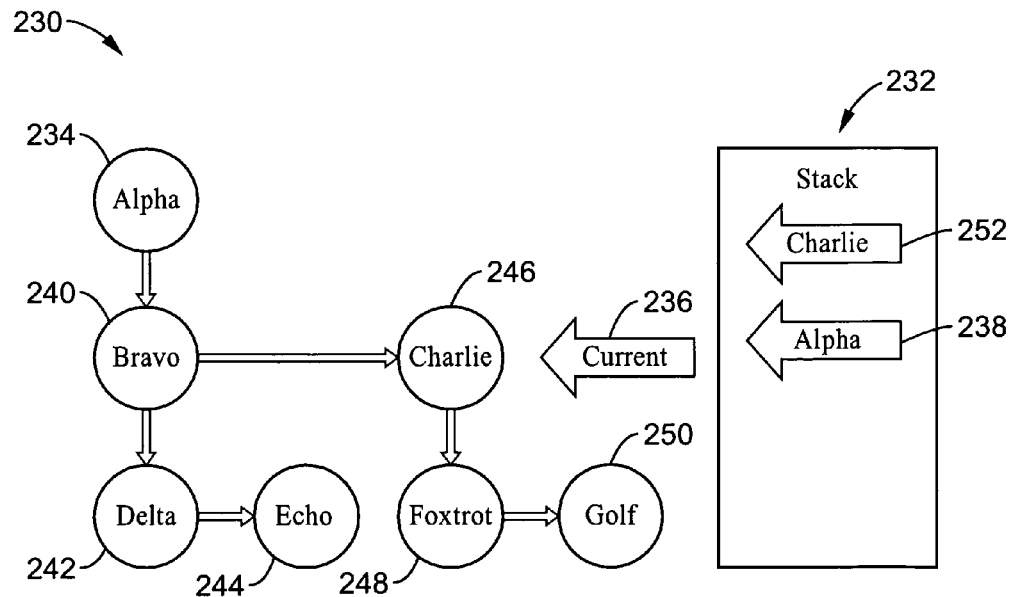
Figure 11C:
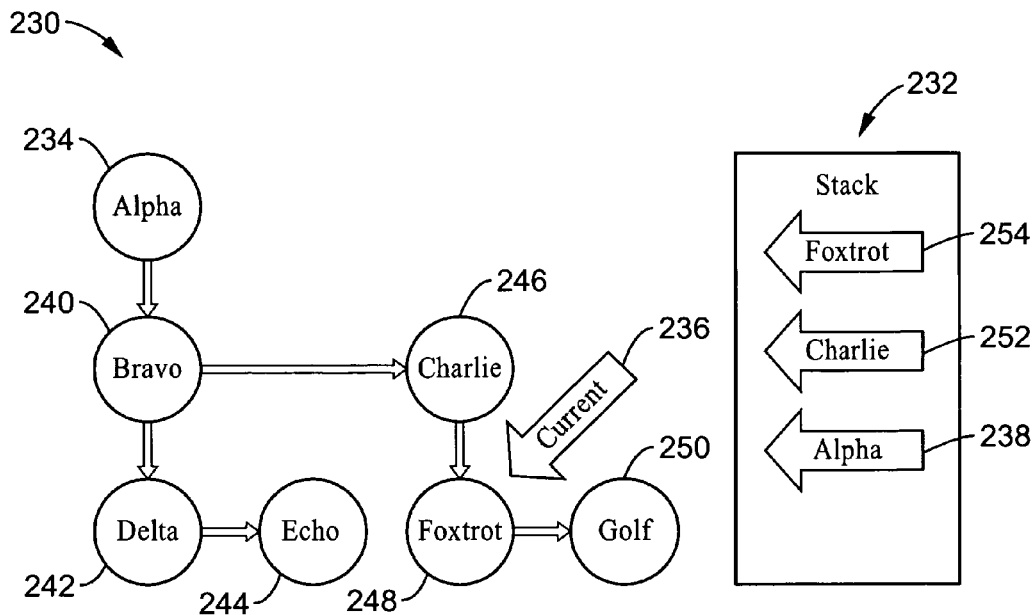
Figure 11D:
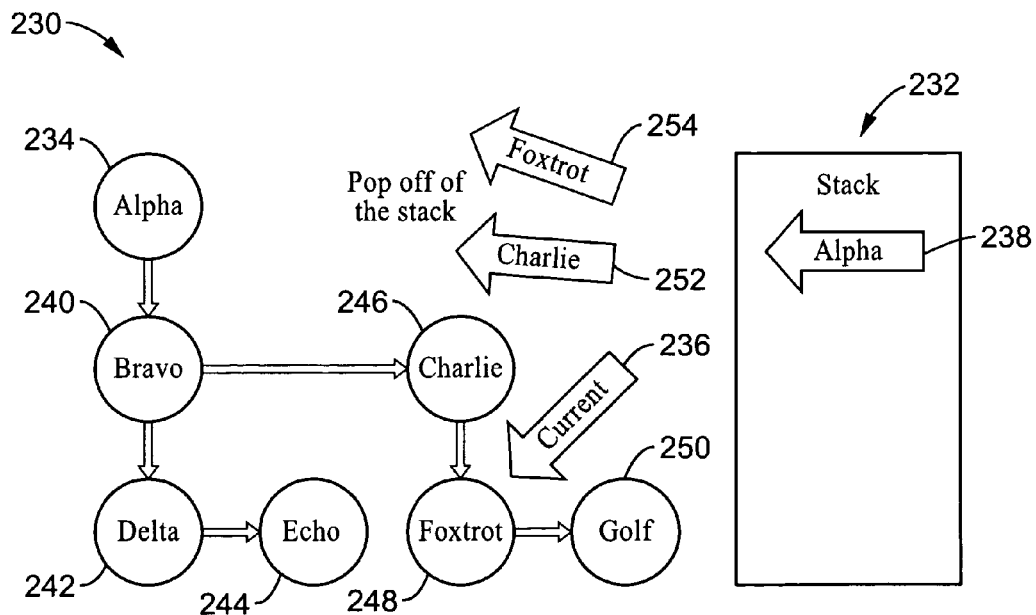
Figure 11E:
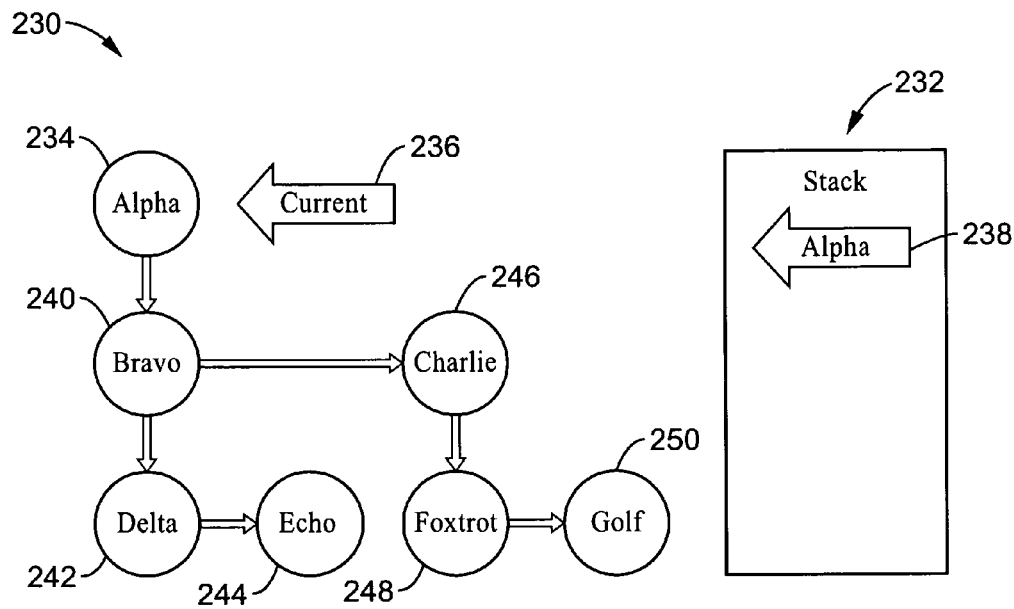

FIG. 11A through FIG. 11E illustrate traversal 230 of a child-sibling tree. The tree is traversed with execution pointer 236 starting at action Alpha 234 in FIG. 11A, with the top-of-stack (TOS) containing a pointer 238 to action Alpha. In FIG. 11B execution has proceeded from Alpha to Charlie where execution pointer 236 is now pointing to action Charlie 246, with the stack containing an Alpha pointer 238 and Charlie pointer 252 on the top of stack (TOS). In FIG. 11C execution pointer 236 is at action Foxtrot 248, whose pointer 254 is on the TOS. In this example a user is presented with a list of actions which have been performed, a history list, from which they may select to return to any prior action step. In FIG. 11D the user has selected to return to action Alpha 234, wherein the stack Foxtrot pointer 254 and stack Charlie pointer 252 are popped from the stack and the execution pointer 236 reloaded from the stack resulting in FIG. 11E wherein execution of action Alpha recommences.

It will be recognized that the action tree nodes preferably do not contain pointers "up" the tree to parents. The stack mechanism, as described above, is utilized to provide movement back up the tree to previously executed actions. The stack contains the name of the action and a pointer to that instance of that particular action, it will be remembered that an action may have many instances within a given action tree. The current action is always at the top of the stack and these pointers can be popped from the stack to return to any prior action. An additional benefit of the stack mechanism is that the user can return to any prior action step while retaining the parameters and configuration that was present when that step was last reached, as this data can be retained in the stack as part of the history.

When coding new actions a number of steps must be performed according to this example embodiment, although other embodiments may not necessarily require these steps. In this example embodiment Start( ), SetNumChoices( ), and Terminate( ) should all be virtual functions in the derived classes. In this way dynamic binding takes place and the desired code is executed at run time. The following is a basic procedure for adding a new action to MINDS.

(1) Check to be certain that the Minds2x workspace is open.
(2) Make "Actions" the active project (Project|Set Active Project|Actions).
(3) Add a string in the string table that is the name of this action as specified in the tree file. Also add a string to the string table for the display names, or what is shown to the user as a description of this action. Preferably, two descriptions are provided one written in present tense and one written as past tense. Make certain to call SetDisplayName( ) in the constructor to set the displayed name to the newly created strings.
(4) If creating an action that requires a user interface, do the following:
  (A) Create a dialog to use and set the ID to the desired dialog ID (each dialog resource created has a unique ID).
  (B) Create a new class derived from CDialog from the ID of the dialog just created.
  (C) Open up the header file for the class just created and add "AbstractAction.h" to the include files.
  (D) In the header file append ", public AbstactAction" to the declaration class. Example class "UIAction : public CDialog" becomes "UIAction "public CDialog, public AbstractAction".
  (E) In the constructor add "Create(IDD, pParent);" so that the modules dialog is created.
  (F) Implement Finished( ) to destroy the window and call AbstractAction:Finished.

If creating an action that does not require a user interface, it is derived from AbstractAction.
(5) In the header file of the newly created action add "resource.h" to the include files.
(6) Implement the following pure virtual functions from AbstractAction: Start( ), Terminate( ), and SetNumChoices( ).
(7) In the constructor add a call to SetNumChoices. (This is 1 based, wherein the first number is 1, as opposed to 0 based where the first number is 0).
(8) In the constructor set the display names (History and Current Operation) from the string are added to the string table.
(9) Check to be certain to set iSelectedChoice when the action is done (this is zero base). This can be performed by implementing Finish( ) for this class and setting it there, or somewhere else.
(10) If the action is derived from CDialog as well, keep track of if the window is destroyed or created, since all actions have the possibility of being called more than once. This may be best performed by adding a private member variable of type boolean, and setting it when the window is created or destroyed. The variable is then set in the constructor and set/check performed in Start( ), Terminate( ), and DestroyWindow( ).
(11) The action is added to the list of actions. To do this the following is performed:
  (A) Open up "ListOfActions.h".
  (B) Add an include for the newly created class.
  (C) In the AllocateAction:Create(LPCTSTR sName) in ListOfActions.cpp add a section to have it create the new action. For the example action "NewAction" the following code would be added:
  sCheck.LoadString(IDS_NEWACTION);
  if(cCheck.CompareNoCase(sName)==0) return new NewAction;

If the action is going to perform an intensive function, such as generating CRCs or blittering, then the intensive action should be launched as a new thread. In this case WaitForSingleObject( ) should not be utilized, as it would make MINDS appear to hang because the application thread is spending its time waiting and cannot respond to other events. Instead the thread should pass a message back to the action when it is finished, so that other messages can be handled while waiting for completion of thread execution.

When a mode of operation is selected, the corresponding text file that specifies the action tree is passed to the action library. The library checks to make sure that the tree is logically correct, if it is not, then MINDS displays an error and exits. If the tree is logically correct, then the action library creates the action tree by dynamically allocating its components. As a consequence the action library not only ensures that trees are logically correct, but it is also preferably responsible for the allocation and de-allocation of the components that make up the action tree as well. Thus the action trees that MINDS uses are created dynamically at run time on the heap.

The system provides a number of checks during building of an action tree as well as during execution. Non-critical errors, such as warnings, are communicated to the user but execution continues. A critical error is defined as an error that occurs when an action is running that prevents the action from successfully completing its task.

Figure 12:
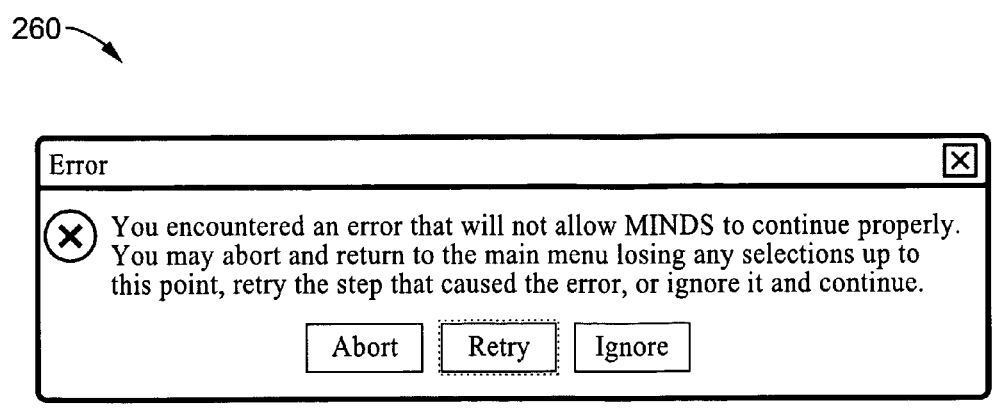
FIG. 12 is a screen shot image of an example error screen according to an aspect of the present invention.

FIG. 12 depicts an example critical error message box 260, such as would be displayed when a critical error is encountered. The action displays a message box detailing the error, then finishes its execution and signals the action tree that a critical error has occurred. The action tree then passes back to the manager that the action has finished running and that a critical error has occurred. The user is then informed via a message box that a critical error has been encountered. At this point the user can elect to retry the action, ignore the error, or abort the execution of the action tree.

To use the MINDS system according to an embodiment of the invention a user powers on a system and boots it up, such as off of a MINDS boot CD. The MINDS boot CD preferably boots into the WinPE operating system (or any other desired OS) that is contained on the CD. After the user provides all of the necessary input the imaging process begins. At this point since no more user input is required, the engineer/technician or other user need not remain with the system and can leave to perform other activities while the selected imaging process is carried out. When the imaging process begins the hard drive is configured and the necessary files loaded onto the system. The system then restarts and boots into the operating system that was recently loaded onto the hard drive. MINDS then installs the modules, cleans up the system, and shuts down. After shutting down, the system is completely imaged and is ready for use.

To assure that the user is truly freed to perform other tasks, one optional aspect of the system provides a mechanism for the user to check the status of the imaging process on the given PC over the company network, wherein the user need not physically return to determine if the imaging process has been successfully completed, or to determine that a fatal error has arisen. Alternatively, MINDS can autonomously generate a message to the user, such as an email message, in response to imaging errors or completion.

It should be noted that when MINDS operates under WinPE, programs written in .NET and programs under Visual Basic 6.0 will not run. As a consequence MINDS was coded in Microsoft Visual C++ 6.0 Service Pack 6.

The use of the C++ language also provides the necessary object-oriented programming features necessary to implement the design of MINDS v2.

The complex source code of MINDS is divided, for example an implementation of the presently described embodiment involves over two hundred fifty (250) files. To isolate changes and make the source code easier to manage, these source code files are encapsulated into six projects that each equate to one executable or dynamically linked library (DLL). This separation of code into the six projects has the added benefit of allowing the code to be compiled more rapidly since only one project normally has to be recompiled when changes are made.

The classic life cycle paradigm for software engineering was used for MINDS. Accordingly, the entire design of MINDS was documented before any coding began. This allowed for design flaws to be identified and fixed before any coding took place. Another benefit is that writing the code for MINDS was a rapid process since all design issues had already been solved in the design phase.

According to an embodiment of the invention there are several GUIs that the user interacts with. The manager GUI is constantly present and allows for the user to control MINDS. The manager is the GUI that allows the user to pause the imaging process or go back to previous steps, which was not possible in earlier MINDS or other imaging systems. Additionally, the user can open a command prompt window, view the contents of the MINDS setup class, or view the user guide. It should also be appreciated that individual actions may also have GUIs.

By way of example and not limitation, in the current system implementation there are sixty nine (69) actions available for use in MINDS. Trees of actions are pieced together from these actions. Modes of operation typically correspond to distinct trees of actions, and the mode of operation is selected from the main menu GUI that first appears when MINDS launches. There are an infinite number of possible modes of operation, but in practice only a few are implemented. A few of the modes of operation require a user name and password to authorize the user for that mode; these modes are referred to as restricted modes of operation. The implemented modes of operation according to this current implementation contain between nine and forty one nodes, and thus instances of actions. The fact that an imaging process contains forty one actions illustrates the fact that imaging is not a simple process.

Figure 13:
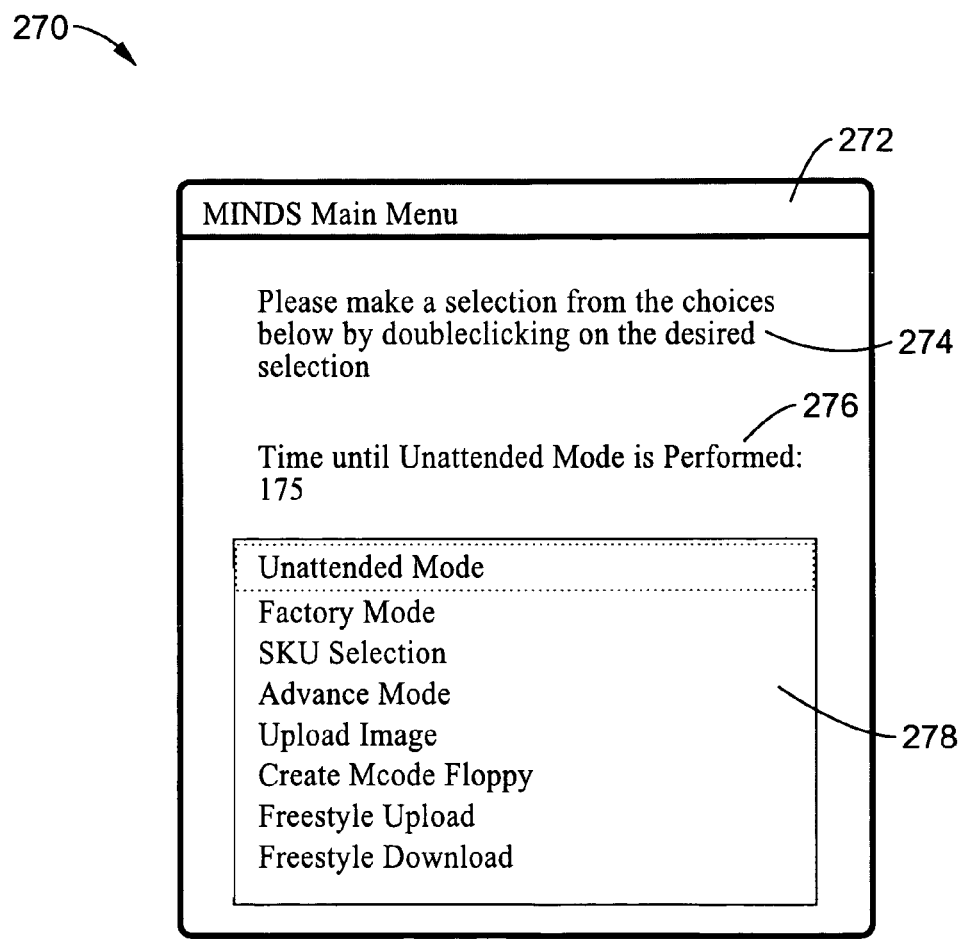
FIG. 13 is a screen shot image of an example main menu screen according to an embodiment of the present invention, showing modes of operation that may be selected.

FIG. 13 illustrates an example embodiment of a main menu screen 270 indicating a number of modes that may be selected by a user. In the described embodiment, the Main Menu screen is the first dialog that the MINDS user encounters after start up. A screen title line 272 is shown adjacent a screen that provides instructions 274, an optional timeout indication, in this case indicating that if a selection is not made within XX seconds then unattended mode will be automatically selected. A menu selection list 278 is shown allowing the user to select any of the listed modes, for example by double-clicking on the desired list element.

Although not shown here, it should be appreciated that certain modes may not be accessible, or even listed, depending on the authorization level of the user, the subnet onto which the system is operating, and other limiting criterion. In this embodiment the user is required to log in with their SMS (or VSMS at Sony) user name and password. Attempting to perform an action for which the user lacks authority can generate an error. Alternatively, if the user does not have access to perform a given action, that list item is not selectable and is preferably displayed to indicate that fact, such as displayed in a faint outline, shaded, or not at all.

It should be appreciated that MINDS can support any number of modes of imaging operations, including by way of example and not limitation, the modes shown in the figure. (1) Unattended Mode—this is the default mode of operation of MINDS v2 that is run if the user does not make an alternate selection within three minutes of starting. In this mode the system is imaged with the components identified in VSMS by the DMI of the given system. (2) Factory Mode—this is similar to unattended mode, except the factory data source is used instead of VSMS. (3) SKU Selection—this mode allows for the user to pick components based on a selected project. (4) Advanced Mode—similar to SKU Selection except that the user is given more options, including the ability to select older versions of some components. This mode provides the user with the most customization out of all the modes of operation. (5) Freestyle Download—A restricted mode of operation that allows the user to download a foundation image to a system without carrying out the entire imaging process. (6) Monolithic Image Download—a restricted mode of operation similar to SKU Selection that permits users more control over the imaging process. (7) Upload Image—A restricted mode of operation that allows foundation images to be captured from a system and uploaded to the image storage server. The image is cleaned up and image identifiers set before uploading takes place. (8) Freestyle Upload—this is a restricted mode of operation that allows images to be uploaded anywhere on the local area network. These images are unaltered, unlike images uploaded to the server using Upload Image mode. (9) Create Mcode Floppy—this mode allows users to create Mcode floppies, which write the DMI of a system. It should be appreciated that other modes can be created to perform any desired image related functionality.

Figure 14:
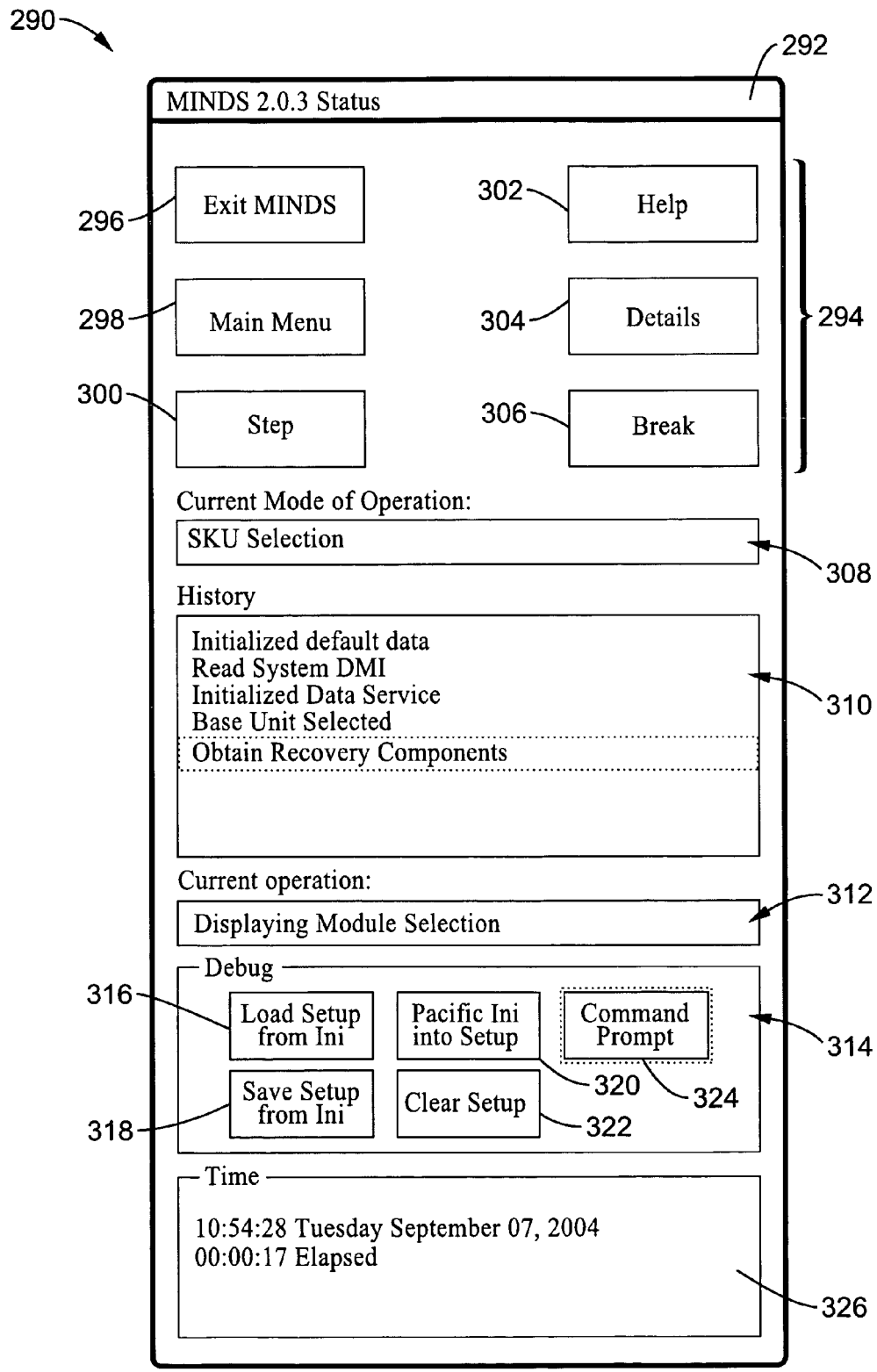
FIG. 14 is a screen shot image of an example status and control screen according to an embodiment of the present invention, showing action history, time, current operation, as well as command options.

FIG. 14 illustrates a status screen 290 that is used within this example embodiment of the invention. The status screen is preferably displayed once the MINDS mode is selected and continues to be displayed as long as the MINDS system is operating. A title block 292 is shown above the status portions of the screen which provides a series of user command selections 296-306, displayed as virtual screen buttons. The "buttons" can be implemented by any conventional method, such as buttons and other selectors according to a window-based GUI paradigm and selected using a pointing device, touch screen or similar. Typically, only the user status commands which can selected at a given time are shown as selectable, for example displaying non selectable items in a light color or not at all.

An "Exit MINDS" button 296 is shown allowing the user to exit the application and restart the system. A "Main Menu" button 298 allows the user to discard current activity, preferably once paused, and to return back to the main menu for selecting another mode of operation (or restarting the presently selected mode). Selecting Main Menu in this embodiment discards any data currently in use, or alternatively stores it away so that it does not interfere with a new mode and configuration. The Main Menu selection allows the MINDS system to start over without a reboot. A "Step" button 300 allows the user to step through the steps of the process, such as the actions within an action tree. A step can only be executed when the system is paused, such as in response to the "Break" command or a previous "Step" command. A "Help" button 302 can bring up information about the modes and other selections available to the user.

A "Details" button 304 provides for opening or closing (i.e., "Details>>" for opening and "Details <<" for closing) of a window with the current data being used by MINDS. This data set includes software components, current mode of operation, and so forth. A "Break"/ "Resume" button 306 allows the user to pause execution after the current operation is complete. When the system executes the break and pauses, then the button displays "Resume" allowing the user to resume execution. In this embodiment the "Main Menu", "Exit MINDS", and "Step" buttons are disabled unless execution has paused, such as by pressing the "Break" button. In addition, while paused the user can select to go back to any of the previous steps in the process by selecting them in the list.

A status line 308 displays the current mode of operation. A history status area 310 displays a log of what the actions have performed, such as displaying one line for each action, presuming atomic actions. According to this embodiment of the invention the last item in the list is the most recent action performed. When the process is paused the user can select any of these steps to jump back to that previous step, for example by double-clicking the desired list element. Another status line 312 is shown displaying the current operation being performed within the action tree.

A debug screen 314 is shown allowing the user additional control over the image process. In this example the user can load setup from the Ini file 316, save setup information from Ini 318, get setup information from Pacific Ini 320, clear the setup 322, and bring up the command prompt window 324.

A time status display area 326 is shown which displays the current system time, the time elapsed since MINDS began execution, and optionally other time related aspects, such as the time for a given step of the process and so forth.

Figure 15A:
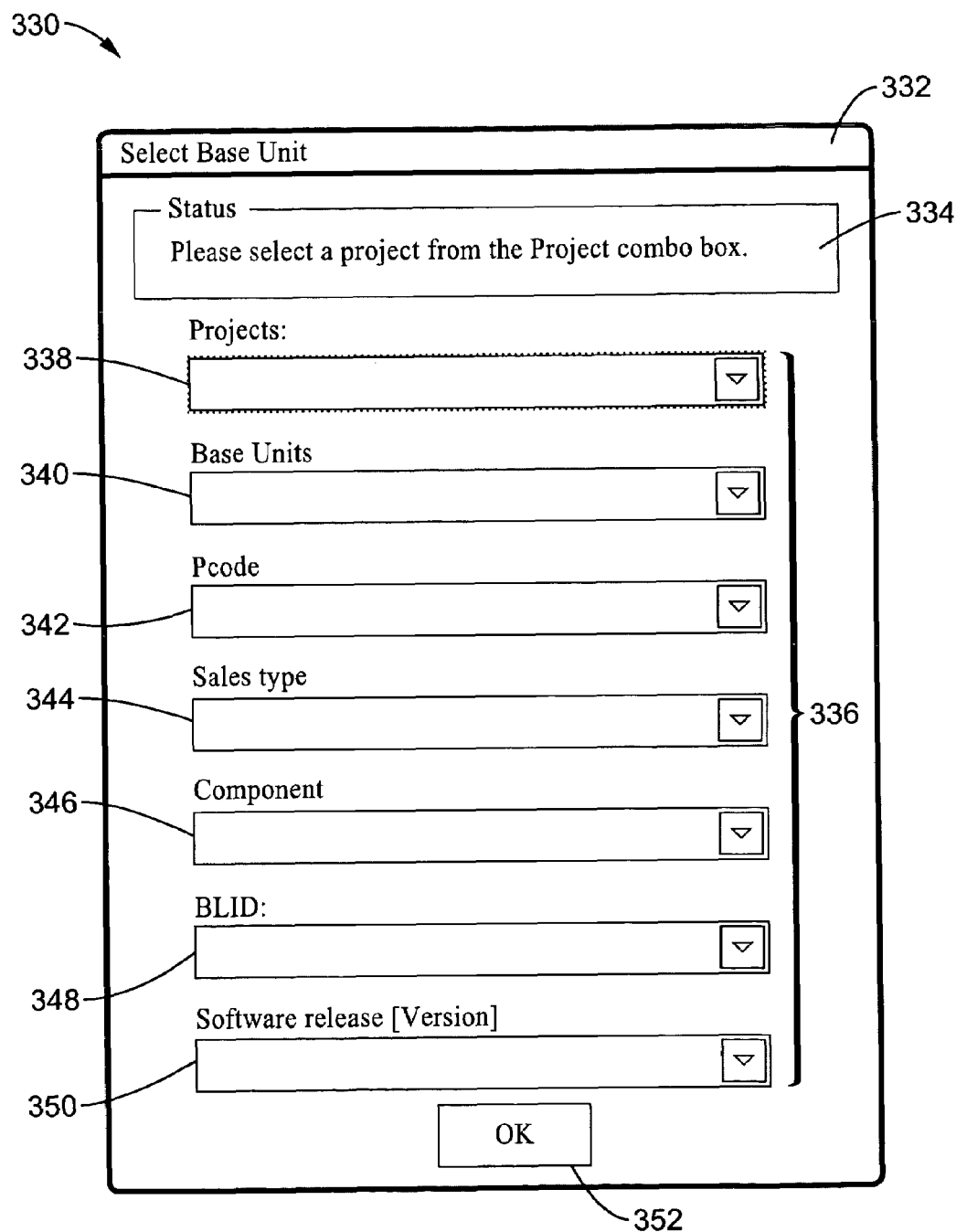
FIG. 15A-15B are screen shot images of example base unit selection screens according to an embodiment of the present invention.
Figure 15B:
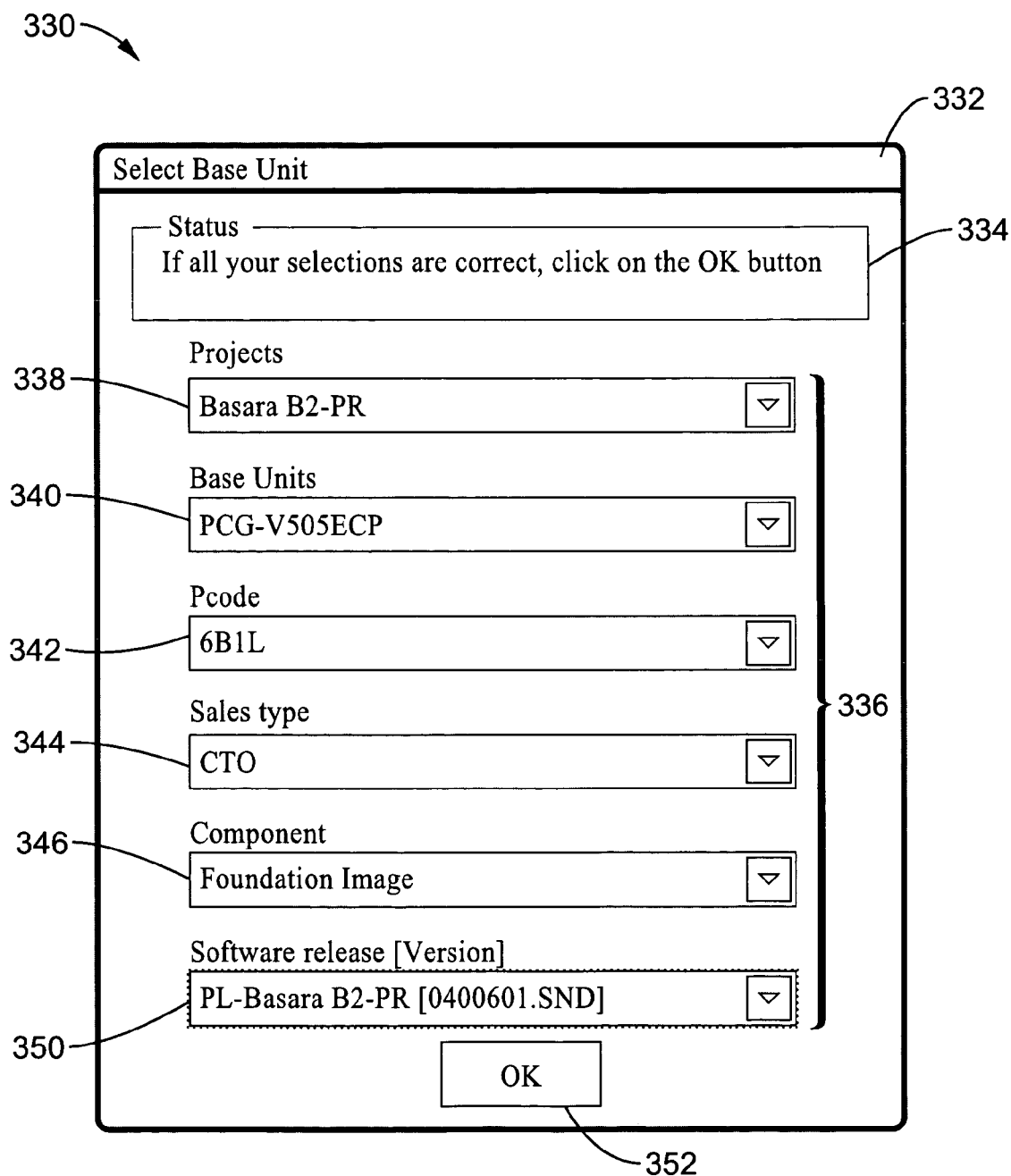

FIG. 15A and FIG. 15B illustrate a base unit selection screen 330 which provides for determining which images are to be put together for use in the present image download situation. A title line 332 is shown above a status display box 334 which is displaying instructions, and a series of selections 336. A number of parameters may be entered in the selection window 336 for establishing the base unit, such as depicted by combo boxes 338-350.

A base unit must be selected when operating in certain operating modes, such as SKU selection, Advance mode, Image Upload and Create Mcode Floppy. By way of example and not limitation the base unit selection depends on the mode of operation, which is briefly described. In SKU mode the user is only allowed to select the currently assigned image for a base unit if it exists on the network. If the user attempts to select a project for which no image is found, then they are given a warning that the image is not available and directed to select another image. In Advance mode the user can select any image that was assigned to a base unit so long as it is available on the network. In Image Upload mode the user is allowed to pick any image that was ever assigned to a project. Since the user is uploading an image from a target system, it will be appreciated that the image for the base unit need not exist on the network prior to the upload. In the Create Mcode Floppy mode the user is allowed to pick any image that was ever assigned to a project.

Selecting a base unit consists of making a selection, or accepting a default, in a number of fields, for this embodiment those fields are exemplified as project 338, base unit model number 340, Pcode 342, sales type 344, component 346, BLID 348 and software release 350. The pull-down menus are designed to let the user drill down to choose a specific image for download. So the selection user interface (UI) starts at the highest level with the model number/name (Base Unit) 340 (i.e., PCG-S260) and works its way down until the unit is sufficiently specified. It should be appreciated that the size and composure of these fields are described for an embodiment of the invention, wherein one of ordinary skill in the art can readily modify these fields without inventive efforts; the resultant embodiment still remaining within the teachings of the present invention.

Pcode 342 is a subcategory of PC (i.e., VAIO model) and in this embodiment comprises a four digit alpha-numeric specifier. By way of example, two different Pcodes may exist for model number PCG-S260, such as S001 for a PCG-S260 with no Wireless LAN Module, and the second Pcode S002 for a PCG-S260 with a wireless LAN module. The model number and Pcode fields are both preferably written to the DMI area of the BIOS for use during imaging.

Sales Type 344 is a category that can be assigned in the SMS database in order to specify different software modules per sales channel.

For example, a PC model with a sales type of retail configured to order ("CTO") may have a completely different list of optional software imaged to it in relation to a PC model with the sales type set for business-to-business ("B2B"). In this case the sales type CTO would be offered through E-Solutions to home users which generally contains games and music software, whereas the B2B type would be offered for bulk business sales channels and may contain productivity software. In this manner the manufacturer can offer various applications toward a specific market segment (e.g., home, business, gamers, multimedia, CAD, servers and so forth). Thus different sales types can further refine the characteristics of a PC without altering the model number or Pcode.

Component 346 is an internal testing option. This option can provide information for selecting what is delivered for the system, for example whether a "monolithic" image is to be delivered where the software modules have already been assembled into one complete image. The "component" selection generally allows a department, such as testing, to select which image set to use.

BLID 348 stands for "BIOS LOCK ID" and is a string which identifies a specific set of images for a PC model. For example, a Windows XP HE (Home Edition) image would have a different BLID than a Windows XP Pro (Professional) image. In some cases, a PC that ships with XP HE might have a different model name or Pcode than a PC having the same hardware but which ships with MS XP Pro. However, since in some cases the model name and Pcode are the same, this option allows the manufacturer control this second case, particularly when the model numbers and assignments are performed across interdisciplinary areas of a manufacturer.

The BLID is also preferably used for protecting the shipping image from piracy. If a user launches the system recovery process, and the BLID in the recovery image does not match the BLID that the manufacturer places in the DMI section of the BIOS, the recovery process halts and a warning message is displayed to the user. This safeguard prevents, for example, a user that purchased a PC with XP HE from trying to use the recovery media for the same model PC that shipped with XP Pro.

Software release 350 allows selecting different iterations of the same image. It is not uncommon in development cycles today for a manufacturer, or department of a manufacturer, to have two or more iterations of the same image as defects are fixed and newer versions are released. The preferred default choice for this field is the latest tested release assigned to the base unit, however, the pull down menu allows the default to be overridden during testing for selecting a different image release.

Accordingly, it should be recognized that a determination of which image is to be downloaded by the MINDS system can be reached in response to allowing the user to set one or more parameters, or accepting default selections.

Once entries have been selected, and/or entered textually, then the base unit screen may appear as in FIG. 15B, wherein the user is prompted to click the OK button to accept the selections. It should be appreciated that the base unit screen is amenable to any desired form of default element selections without departing from this aspect of the invention. For example fields can be populated in a new screen according to most recent activity, patterns of use, and so forth. Once satisfied with the selections the user can press the OK button 352 to perform the base unit selection.

FIG. 16 illustrates by way of example a module and switch selection screen 370 example according to this embodiment of the invention. A title line 372 is shown over a set of selections 374, depicted as combo boxes along with an OK (submit selections) button. The module and switch selections are only necessary, or allowed, within certain modes of MINDS operation, specifically SKU, Advance, and Create Mcode Floppy modes. The check box is checked if that element should be included in the image set. Depending on the base unit type some of the check boxes are unselectable as they are required. Items that appear in one base unit may not appear on other base unit selection screens, which would be expected since base unit selection determines the range of modules and switches which can be used with the given base. Typically, in the case of creating a retail unit, all combo boxes are unselectable, while prior versions and configurations are available to the user in Advance mode and Create Mcode Floppy mode. Consequently, MINDS is configured with the ability to copy a complete bill of materials (BOM) to the target system.

It should be recognized that the imaging process is constantly evolving, and as a result MINDS will be frequently updated to keep synchronized with those changes. MINDS is also occasionally updated to accommodate new features on the target computer systems, RAID is one example. One of the key priorities when making these updates is to keep the design documentation up to date as well. This is one of the primary maintenance principles of modern software engineering.

The task of re-imaging systems is carried out frequently during the development and testing of most computer based systems. The MINDS system has several innovative aspects that in combination can provide substantial returns on investment from reducing support overhead (man hours), reduced time delays when imaging, reduced software development costs, and by providing an ability to readily support a wide range of image sets. One important innovation described is the use of actions within MINDS similar to interchangeable building blocks assembled to form a tree of actions defining a desired process. This aspect of the invention alters how new image processes are created. It will be appreciated that what was before a software development exercise, is converted under MINDS into a building block assembly process— much as one might build any desired small structure with a sufficient supply of LEGO® blocks. The flexible framework of MINDS can be utilized in many other types of processes besides software imaging, without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for automated configuration of software program images on a computer, comprising:
    a modular network downloading process configured for accessing image files from a network to configure program images on a computer;
    a plurality of action routines each configured for performing a specific operation within said modular network downloading program;
    means for defining a tree of said action routines to be executed by said modular network downloading program;
    means for user selection of a foundation image upload mode within said modular network downloading process to load a foundation image configured for the specific hardware of the computer and comprising the operating system, drivers and applications.

2. An apparatus as recited in claim 1, wherein said action routines are dynamically linked to said modular network downloading program.

3. An apparatus as recited in claim 1, wherein said tree of said action routines is defined by text within a configuration file which does not need to be compiled.

4. An apparatus as recited in claim 1, wherein said modular network downloading process comprises:
    a management layer configured for executing actions during traversal of said action tree; and
    a user interface configured for controlling the operations of said management layer for the desired automated installation being performed, and configured with said means for user selection of a foundation image upload mode.

5. An apparatus for automated configuration of software program images on a computer, comprising:
    an action tree layer having a plurality of actions which may be dynamically linked executed during automated software installation;
    at least one action tree having a plurality of nodes each of which contain at least one pointer to an action from said action tree layer;
    a management layer configured for executing actions during traversal of said action tree; and
    a user interface configured for controlling the operations of said management layer for the desired automated installation being performed, and adapted for user selection of a foundation image upload mode for loading a foundation image configured for the specific hardware of the computer and comprising the operating system, drivers and applications.

6. An apparatus as recited in claim 5, wherein said tree of said action routines is defined by text within a configuration file which does not need to be compiled.

7. An apparatus as recited in claim 5, wherein said actions are functionally independent actions that can be reused within a given action tree and across different action trees.

8. An apparatus as recited in claim 5, wherein any of said actions can be launched as a separate execution thread thereby allowing the action to respond to other requests.

9. An apparatus as recited in claim 5, wherein distinct trees of action are selectable by said user interface as operating modes.

10. An apparatus as recited in claim 5, wherein a user can interface with said actions through said user interface or using a user interface generated by the action itself, or a combination of both user interfaces.

11. An apparatus as recited in claim 5, wherein said software program images comprises a single foundation image or a combination of a single foundation image with at least one application program module.

12. An apparatus as recited in claim 5, wherein said management layer need not be recompiled in response to a change in said action tree and the linking or releasing of different actions from within said action tree layer.

13. An apparatus as recited in claim 5, wherein each said node of said action tree contains a pointer to an action, a pointer to a child node of the action tree and a pointer to a sibling node of the action tree.

14. An apparatus as recited in claim 5, wherein said user interface is configured to allow the user to select an operating mode for said apparatus.

15. An apparatus for automated configuration of software program images on a computer, comprising:
    an action tree layer having a plurality of actions which may be dynamically linked and executed during automated software installation;
    at least one action tree having a plurality of nodes each of which contain at least one pointer to an action from said action tree layer;
    a management layer configured for executing actions during traversal of said action tree; and
    a user interface configured for controlling the operations of said management layer for the desired automated installation being performed;
    wherein said user interface is configured to allow the user to select an operating mode for said apparatus; and
    wherein said operating mode may be selected from the group of operating modes consisting essentially of: unattended operation, factory floor, component selection mode, extended component selection mode, foundation image upload and freestyle image upload and download configured for the specific hardware of the computer.

16. An apparatus as recited in claim 5:
    wherein said pointer to an action does not specify a specific action but a location in the action tree association with that action; and
    wherein the actions themselves remain independent of one another.

17. An apparatus as recited in claim 5, wherein one or more of said actions can be selected for execution within an action tree from a group of processing actions consisting essentially of: creating an Mcode media, uploading Mcode from the desktop management interface (DMI) of a system, downloading a foundation image to a system hard drive, downloading an application module image to a system hard drive, uploading a foundation image from a system hard drive, uploading an application module image from a system hard drive, recover a foundation image from a recovery partition, media version verification, blitter, assign target drive, select base unit, clean up image removing unnecessary files, copy images to recovery partition, copy modules to partition, create image CRCs, create Mcode floppy, display splash screen, display desktop management interface comparison, eject media, find correct target drive, get hard drive information, verify if on network subnet, end logging session, map network drives, partition query, partition hard drive, restart, restricted login, return to main menu, verify that image components exist, and create thread.

18. A method of configuring computers with software program images, comprising:
    creating and compiling a set of separately executable actions for performing image configuration actions on a computer;
    creating and compiling a management layer which executes actions defined within a selected action tree;
    creating and compiling a user interface layer which controls action tree selection and progress through the action tree;
    creating an action tree structure having a plurality of nodes which include pointers to actions and to other nodes in said action tree;
    linking the actions, management layer, user interface and action tree into a program which executes actions defined in the action tree according to user input; and
    user selecting of a foundation image upload mode for loading a foundation image configured for the specific hardware of the computer and comprising the operating system, drivers and applications.

19. A method as recited in claim 18:
    wherein said action tree structure comprises nodes connected according to a child pointer relationship, sibling pointer relationship, or a combination of child and sibling pointer relationships with one another; and
    wherein said pointer relationship comprises a pointer to node locations in the action tree that the action is located.

20. A method as recited in claim 18, wherein said software program images comprise a combination of a single foundation image with at least one application program module.

* * * * *

UNITED STATES PATENT AND TRADEMARK OFFICE
CERTIFICATE OF CORRECTION

PATENT NO. : 7,653,903 B2 Page 1 of 1
APPLICATION NO. : 11/090637
DATED : January 26, 2010
INVENTOR(S) : Purkeypile et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Twenty-third Day of November, 2010

David J. Kappos
*Director of the United States Patent and Trademark Office*